US011952836B2

(12) United States Patent
Lai

(10) Patent No.: US 11,952,836 B2
(45) Date of Patent: Apr. 9, 2024

(54) ROLLER SHUTTER

(71) Applicant: Chung Tai Roller Shutters Company Limited, New Territories (HK)

(72) Inventor: Ho Yan Lai, Kowloon (HK)

(73) Assignee: CHUNG TAI ROLLER SHUTTERS COMPANY LIMITED, Hong Kong (HK)

( * ) Notice: Subject to any disclaimer, the term of this patent is extended or adjusted under 35 U.S.C. 154(b) by 82 days.

(21) Appl. No.: 17/351,447

(22) Filed: Jun. 18, 2021

(65) Prior Publication Data

US 2021/0396073 A1 Dec. 23, 2021

(30) Foreign Application Priority Data

Jun. 23, 2020 (HK) ........................... 32020009854.1

(51) Int. Cl.
*E06B 9/15* (2006.01)
*E06B 9/17* (2006.01)
(Continued)

(52) U.S. Cl.
CPC ............ *E06B 9/15* (2013.01); *E06B 9/17007* (2013.01); *E06B 9/17076* (2013.01);
(Continued)

(58) Field of Classification Search
CPC .... E06B 9/15; E06B 9/17007; E06B 9/17076; E06B 9/174; E06B 9/582;
(Continued)

(56) References Cited

U.S. PATENT DOCUMENTS 5,862,851 A * 1/1999 Stoebich ................... E06B 9/58 160/246
8,037,921 B2 * 10/2011 Dondlinger ............. E06B 9/581 160/264
(Continued)

FOREIGN PATENT DOCUMENTS

BE 1 021 818 B1 1/2016
CN 201857878 U 6/2011
(Continued)

OTHER PUBLICATIONS

Low-Temperature Soldering—Indium Corp—Web Archive of https://www.indium.com/applications/pcb-assembly/low-temperature-soldering/—May 12, 2020 (Year: 2020).*
(Continued)

*Primary Examiner* — Johnnie A. Shablack
*Assistant Examiner* — John W Hanes, Jr.
(74) *Attorney, Agent, or Firm* — Ware, Fressola, Maguire & Barber LLP

(57) ABSTRACT

A roller shutter includes a chamber with an opening, a roller curtain movable between being fully contained within the chamber and extended beyond the chamber through the opening, and at least one guide rail along and relative to which the roller curtain is movable between being retracted and extended, wherein the roller curtain includes a plurality of slat members interlocked with each other for relative pivotal movement, the plurality of slat members collectively forming first and second major surfaces, and a first layer of fire-resistant and/or heat-resistant fabric fixedly mounted to the first major surface of the slat members and a second layer of fire-resistant and/or heat-resistant fabric fixedly mounted to the second major surface of the slat members, and wherein the guide rail includes at least a first sealing member which, when the roller curtain is extended, contacts or
(Continued)

presses into the first layer of fire-resistant and/or heat-resistant fabric.

5 Claims, 36 Drawing Sheets

(51) Int. Cl.
*E06B 9/174* (2006.01)
*E06B 9/58* (2006.01)

(52) U.S. Cl.
CPC .............. *E06B 9/174* (2013.01); *E06B 9/582* (2013.01); *E06B 2009/1505* (2013.01); *E06B 2009/588* (2013.01)

(58) Field of Classification Search
CPC ....... E06B 2009/1505; E06B 2009/588; E06B 2009/17069; E06B 2009/17084; A62C 2/10
See application file for complete search history.

(56) References Cited

U.S. PATENT DOCUMENTS

| | | | | |
|---|---|---|---|---|
| 2015/0306435 | A1* | 10/2015 | Margolin | A62C 3/0257 169/48 |
| 2017/0122030 | A1* | 5/2017 | Zhang | E06B 9/582 |
| 2018/0371833 | A1* | 12/2018 | Klish | E06B 9/13 |
| 2020/0340296 | A1* | 10/2020 | Wong | E06B 9/68 |
| 2021/0087874 | A1 | 3/2021 | Dawdy | |

FOREIGN PATENT DOCUMENTS

| | | | |
|---|---|---|---|
| CN | 205823100 | U | 12/2016 |
| CN | 206503543 | U | 9/2017 |
| CN | 206737749 | U | 12/2017 |
| CN | 208236260 | U | 12/2018 |
| CN | 110700746 | A | 1/2020 |
| DE | 20 2020 105 994 | U1 | 3/2022 |
| EP | 2840223 | A1 | 2/2015 |
| WO | 2014/108064 | A1 | 7/2014 |
| WO | 2018/183339 | A1 | 10/2018 |

OTHER PUBLICATIONS

Magnesium Oxide Wallboard—Ultimate Solutions—Web Archive of https://www.ultimate-solutions.co.nz/shop/A-Z%2Blist%2Bof%2Ball%2BSurface%2BProtection%2Bproducts/Magnesium%2BOxide%2BWall%2BBoard%2B-Flame%2Bbarrier%3Fsku%3D01017.html—Feb. 3, 2018 (Year: 2018).*
Bibliographic data for publication CN110700746A including English Abstract, 2 pages.
Bibliographic data for publication CN205823100U including English Abstract, 1 page.
Bibliographic data for publication CN206737749U including English Abstract, 2 pages.
Bibliographic data for publication EP2840223A1 including English Abstract, 2 pages.
Bibliographic data for publication CN201857878U including English Abstract, 1 page.
Bibliographic data for publication CN206503543U including English Abstract, 1 page.
Bibliographic data for publication CN208236260UU including English Abstract, 1 page.
Extended European search report, dated Nov. 30, 2021, Application No. 21180278.0, 8 pages.
Machine translation from German to English, DE 20 2020 105 994 U1, 17 pages.
European Patent Office Communication under Rule 71(3) EPC dated Jun. 22, 2023, Intention to Grant application No. 21 180 278.0, including newly cited document DE 20 2020 105 994 U1, 8 pages.

* cited by examiner

ROLLER SHUTTER

BACKGROUND OF THE INVENTION

This invention relates to a roller shutter, and in particular such a roller shutter which at least hinders the spread of smoke across the roller shutter.

According to building regulations and ordinances in many countries or jurisdictions, in public areas of buildings, a fire compartment is required to be set for each specified floor area, e.g. every 2,000 $m^2$, of indoor area, for preventing or at least hindering the spread of fire, for protection of life and property. Fire-rated roller shutters are generally installed between fire compartments for such a purpose. When a fire breaks out, the roller shutters can close quickly, so as to prevent or at least hinder the spread of fire, smoke and heat.

For example, according to Hong Kong building regulations, for fire-rated roller shutters installed on walls of a building, as the walls possess fire integrity and heat resistance, the roller shutters should be of equal fire integrity and heat resistance, and can assist in hindering the spread of smoke.

When a fire breaks out, much smoke is generated, which spreads to various other areas in the premises. Smoke spread to areas not in the immediate vicinity of the fire may also prevent safe evacuation of people from the premises. It is also found that much casualty is caused by inhaling smoke.

FIG. 1 is a front view of a conventional vertically-sliding roller shutter 10 in a fully extended configuration. The roller shutter 10 includes a chamber 12 in which an axle 14 is contained. A roller curtain 16 is attached with the axle 14 so that, upon rotation of the axle 14 around its horizontal central longitudinal axis in one direction, the roller curtain 16 is retracted and contained within the chamber 12 and wound around the axle 14, in which the roller curtain 16 is in a "retracted configuration", and upon rotation of the axle 14 around its central longitudinal axis in the opposite direction, the roller curtain 16 is unwound from the axle 14 to extend out of the chamber 12 (in which the roller curtain 16 is in an "extended configuration") until the free end of the roller curtain 16 reaches the floor level (as shown in FIG. 1) (in which the roller curtain 15 is in a "fully extended configuration"), to form a barrier against passage of, e.g. fire and/or smoke, across the lowered roller curtain 16. Thus, in use, when the roller curtain 16 is in the fully extended configuration, the roller curtain 16 extends across a space to prevent passage of fire and/or smoke through the space and when the roller curtain 16 is in the retracted configuration, passage through the space is allowed. Movement of the roller curtain 16 amongst the retracted configuration, the extended configuration and the fully extended configuration is guided by a pair of vertical guide rails 18 which are parallel to each other.

Turning to FIG. 2, a sectional view A-A of FIG. 1, shows a part of the roller curtain 16 extending beyond the chamber 12 through an opening 20 of the chamber 12, in which the arrows show the direction of flow of smoke. In case of fire, smoke from the fire side may enter the chamber 12 through a gap 22 of the opening 20 not occupied by the roller curtain 16, and exit the chamber 12 through another gap of the opening 20 on the other side of the roller curtain 16. Smoke may thus spread from the fire side to a non-fire side through the chamber 12.

FIG. 3, a sectional view of the part marked B of the conventional roller shutter of FIG. 1, shows a lateral part of the roller curtain 16 received within one of the guide rails 18, in which the arrows show the direction of flow of smoke. Again, in case of fire, smoke from the fire side may enter the guide rail 18 through a gap 24 between the roller curtain 16 and the guide rail 18, and exit the guide rail 18 through another gap 26 between the roller curtain 16 and the guide rail 18, which is on the other side of the roller curtain 16. Smoke may thus spread from the fire side to a non-fire side through the guide rail 18.

Turning to FIG. 4, a sectional view of the part marked C of the conventional roller shutter of FIG. 1, such shows a free end of the roller curtain 16 reaching and touching the floor level when the roller curtain 16 is in the fully extended configuration. In this configuration, whether the smoke on the fire side may pass to the non-fire side, e.g. from under the free end of the roller curtain 16, will depend on whether there is any gap between the free end of the roller curtain 16 and the floor level.

FIGS. 5 and 6 show a conventional laterally-sliding roller shutter 30 in a fully extended configuration. The roller shutter 30 includes a chamber 32 in which an axle 34 is contained. A roller curtain 36 is attached with the axle 34 so that, upon rotation of the axle 34 around its vertical central longitudinal axis in one direction, the roller curtain 36 is retracted and contained within the chamber 32 and wound around the axle 34 (in which the roller curtain 36 is in a "retracted configuration"), and upon rotation of the axle 34 around its central longitudinal axis in the opposite direction, the roller curtain 36 is unwound from the axle 34 to extend out of the chamber 32 (in which the roller curtain 36 is in an "extended configuration") until the free end of the roller curtain 36 is received within a receiving trough 38 (as shown in FIGS. 5 and 6) (in which the roller curtain 36 is in a "fully extended configuration"), to form a barrier against passage of, e.g. fire and/or smoke, across the fully extended roller curtain 36. Movement of the roller curtain 36 among the retracted configuration, the extended configuration and the fully extended configuration is guided by a horizontal guide rail 40 under and relative to which the roller curtain 36 moves.

Turning to FIG. 7, such is a sectional view of the conventional roller shutter across D of FIG. 6 and shows a part of the roller curtain 36 extending beyond the chamber 32 through an opening 42 of the chamber 32, in which the arrows show the direction of flow of smoke. In case of fire, smoke from the fire side may enter the chamber 32 through a gap 44 of the opening 42 not occupied by the roller curtain 36, and exit the chamber 32 through another gap 46 of the opening 42 on the other side of the roller curtain 36. Smoke may thus spread from the fire side to a non-fire side through the chamber 32.

FIG. 8 is a sectional view of the part marked E of the conventional roller shutter of FIG. 6 and shows an upper part of the roller curtain 36 received within the guide rail 40, in which the arrows show the direction of flow of smoke. Again, in case of fire, smoke from the fire side may enter the guide rail 40 through a gap 48 between the roller curtain 36 and the guide rail 40, across a transmission chain 50, and exit the guide rail 40 through another gap 52 between the roller curtain 36 and the guide rail 40, which is on the other side of the roller curtain 36. Smoke may thus spread from the fire side to a non-fire side through the guide rail 40.

FIG. 9 is a sectional view of the part marked F of the conventional roller shutter of FIG. 6 and shows a free end 54 of the roller curtain 36 received within the receiving trough 38, in which the arrows show the direction of flow of smoke. In case of fire, smoke from the fire side may enter the receiving trough 38 through a gap 56 between the roller curtain 36 and the receiving trough 38, and exit the receiving trough 38 through another gap 58 between the roller curtain 36 and the receiving trough 38, which is on the other side of the roller curtain 36. Smoke may thus spread from the fire side to a non-fire side through the receiving trough 38.

Turning to FIG. 10, such shows a partial front view of the laterally-sliding roller shutter 30. For laterally-sliding roller shutters, there is usually a 15 mm gap 60 between the lower end of the roller curtain 36 and the floor level, to allow smooth movement of the roller curtain 36 among the retracted configuration, the extended configuration and the fully extended configuration. As hot air in the fire side rises, there is a volume within the fire side from the floor level to about 500 mm above the floor level at an air pressure which is negative relative to the atmospheric pressure. Thus, cooler air from the non-fire side of the roller curtain 30 will pass through the gap 60 between the lower end of the roller curtain 36 and the floor level to the fire side. This will inhibit the spread of smoke from the fire side to the non-fire side through the gap 60 between the lower end of the roller curtain 36 and the floor level to the fire side.

FIG. 11 shows a conventional horizontally-sliding roller shutter 70 in a fully extended configuration. The roller shutter 70 includes a chamber 72 in which an axle 74 is contained. A roller curtain 76 is attached with the axle 74 so that, upon rotation of the axle 74 around its horizontal central longitudinal axis in one direction, the roller curtain 76 is retracted and contained within the chamber 72 and wound around the axle 74 (in which the roller curtain 76 in a "retracted configuration"), and upon rotation of the axle 74 around its central longitudinal axis in the opposite direction, the roller curtain 76 is unwound from the axle 74 to extend out of the chamber 72 (in which the roller curtain 76 is in an "extended configuration") until the free end of the roller curtain 76 is received within a receiving trough 78 (as shown in FIG. 11) (in which the roller curtain 76 is in a "fully extended configuration"), to form a barrier against passage of, e.g. fire and/or smoke, across the fully extended roller curtain 76. Movement of the roller curtain 76 among the retracted configuration, the extended configuration and the fully extended configuration is guided by a pair of parallel horizontal guide rails 80 relative to which the roller curtain 76 moves.

FIG. 12 shows a partial view of an alterative arrangement of the conventional horizontally-sliding roller shutter 70 in a fully extended configuration, in which the free end of the roller curtain 76 is received within the floor level. In this arrangement, as the free end of the roller curtain 76 should be in close contact with the floor level, no smoke should pass through between the roller curtain 76 and the floor level.

On the other hand, and as shown in FIG. 13, which is a sectional view of the part marked G of the conventional roller shutter of FIG. 11, a part of the roller curtain 76 extends beyond the chamber 72 through an opening 82 of the chamber 72, in which the arrows show the direction of flow of smoke. In case of fire, smoke from the fire side may enter the chamber 72 through a gap 84 of the opening 82 not occupied by the roller curtain 76, and exit the chamber 72 through another gap 86 of the opening 82 on the other side of the roller curtain 76. Smoke may thus spread from the fire side to a non-fire side through the chamber 72.

In addition, FIG. 14 is a sectional view of the part marked H of the conventional roller shutter of FIG. 11 and shows a lateral part of the roller curtain 76 received within the guide rail 80, in which the arrows show the direction of flow of smoke. Again, in case of fire, smoke from the fire side may enter the guide rail 80 through a gap 88 between the roller curtain 76 and the guide rail 80, and exit the guide rail 80 through another gap 90 between the roller curtain 76 and the guide rail 80, which is on the other side of the roller curtain 76. Smoke may thus spread from the fire side to a non-fire side through the guide rail 80.

Furthermore, FIG. 15 is a sectional view of the part marked J of the conventional roller shutter of FIG. 11 and shows a free end 92 of the roller curtain 76 received within the receiving trough 78 (as shown in the arrangement shown in FIG. 11), in which the arrows show the direction of flow of smoke. In case of fire, smoke from the fire side may enter the receiving trough 78 through a gap 98 between the roller curtain 76 and the receiving trough 78, and exit the receiving trough 78 through another gap 96 between the roller curtain 76 and the receiving trough 78, which is on the other side of the roller curtain 76. Smoke may thus spread from the fire side to a non-fire side through the receiving trough 78.

BRIEF SUMMARY OF THE INVENTION

It is thus an object of the present invention to provide a roller shutter in which the at least one of the aforesaid shortcomings is mitigated or at least to provide a useful alterative to the trade and public.

According to the present invention, there is provided a roller shutter including a chamber with an opening, a roller curtain movable between a retracted configuration in which said roller curtain is substantially fully contained within said chamber and an extended configuration in which at least part of said roller curtain extends beyond said chamber through said opening, and at least one guide rail along and relative to which said roller curtain is movable between said retracted configuration and said extended configuration, wherein said roller curtain includes a plurality of slat members interlocked with each other for relative pivotal movement, said plurality of slat members collectively forming a first major surface and a second major surface, and a first layer of fire-resistant and/or heat-resistant fabric fixedly mounted to said first major surface of said plurality of slat members and a second layer of fire-resistant and/or heat-resistant fabric fixedly mounted to said second major surface of said plurality of slat members, and wherein said guide rail includes at least a first sealing member which, when said roller curtain is in said extended configuration, contacts or presses into said first layer of fire-resistant and/or heat-resistant fabric to form a first seal which at least hinders the passage of smoke there-through.

BRIEF DESCRIPTION OF THE SEVERAL VIEWS OF THE DRAWING

Roller shutters according to various embodiments of the present invention will now be described, by way of examples only, with reference to the accompanying drawings, in which.

DETAILED DESCRIPTION OF THE INVENTION

Figure 1:
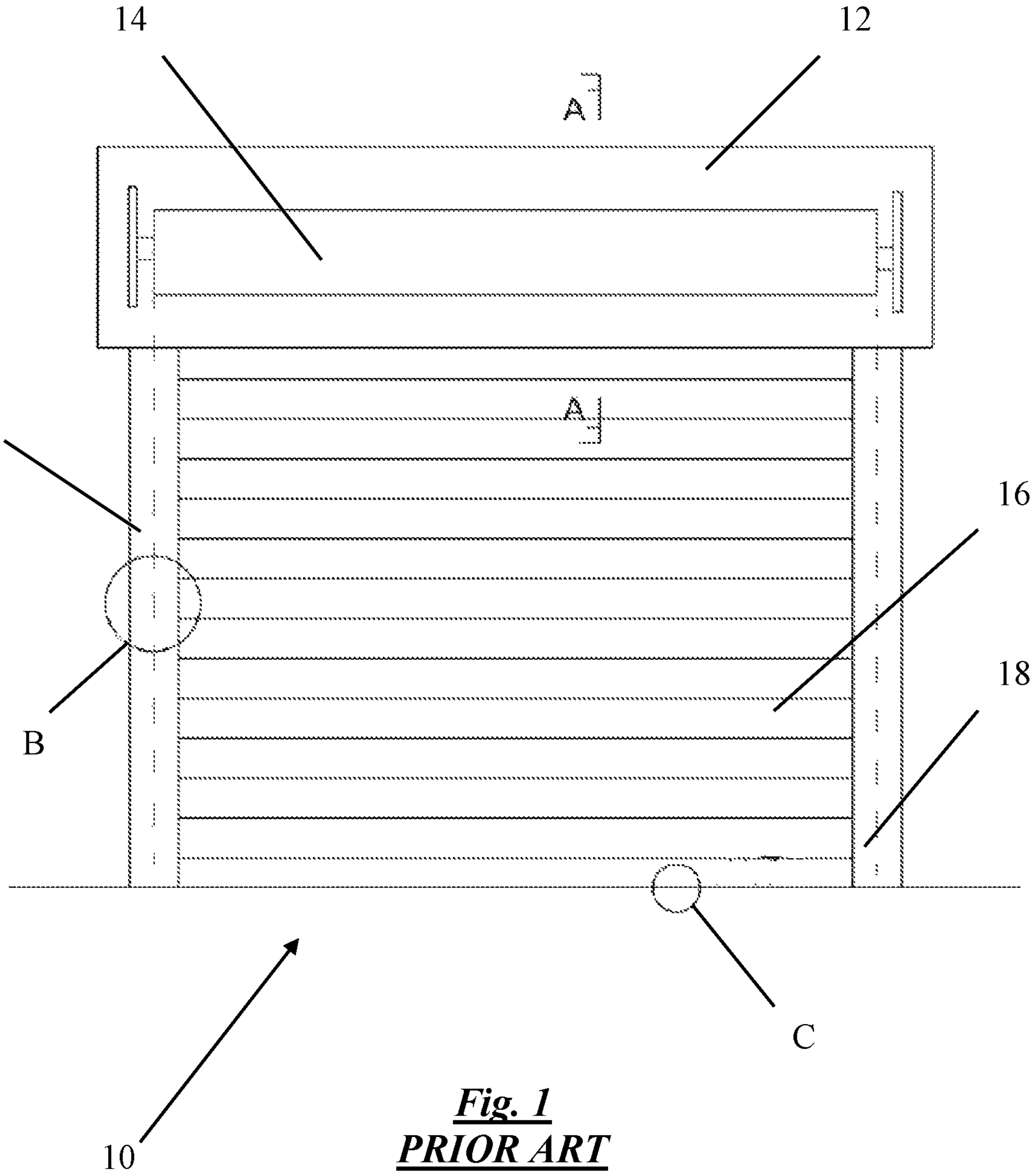
Fig. 1 PRIOR ART
FIG. 1 is a front view of a conventional vertically-sliding roller shutter in which the roller curtain is in a fully extended configuration.
Figure 2:
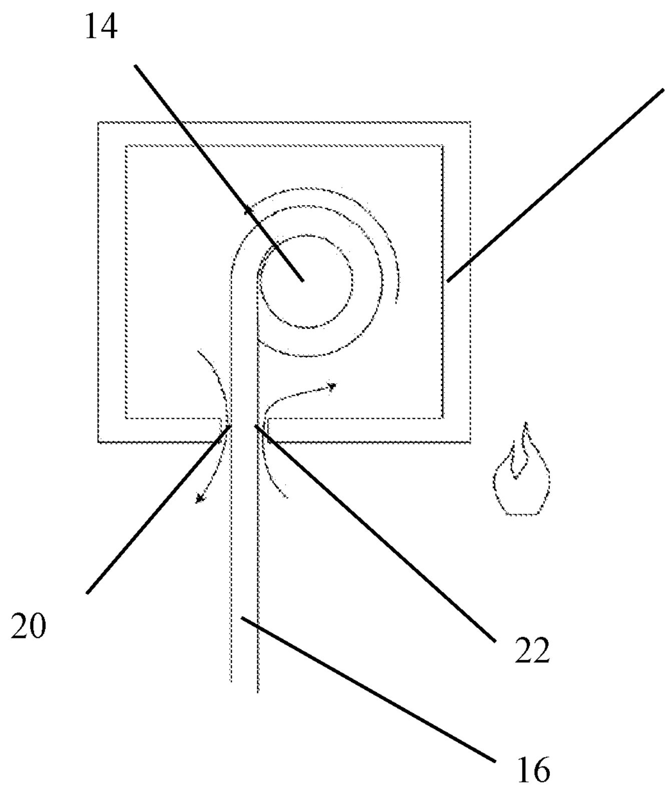
Fig. 2 PRIOR ART
FIG. 2 is a sectional view of the conventional roller shutter across A-A of FIG. 1.
Figure 3:
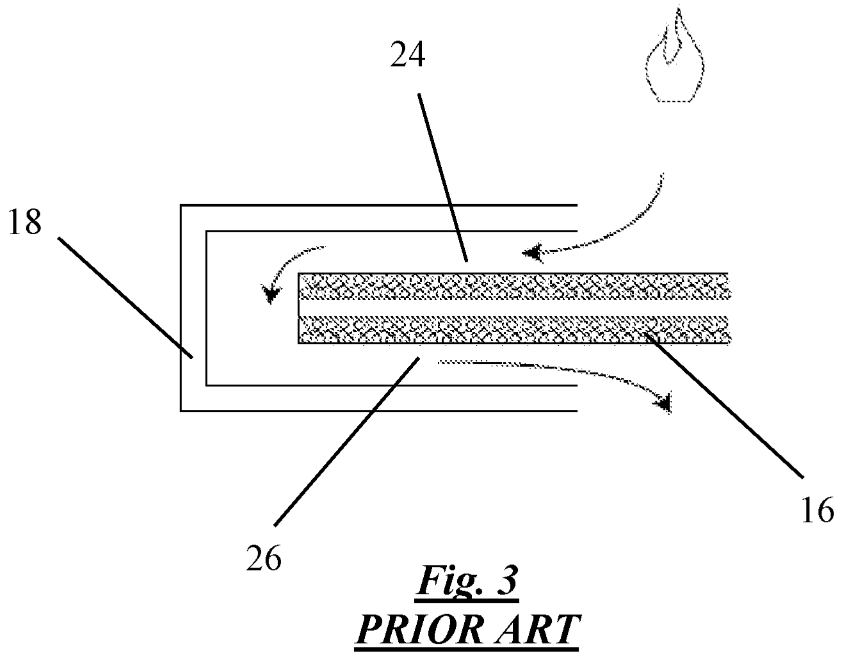
Fig. 3 PRIOR ART
FIG. 3 is a sectional view of the part marked B of the conventional roller shutter of FIG. 1.
Figure 4:
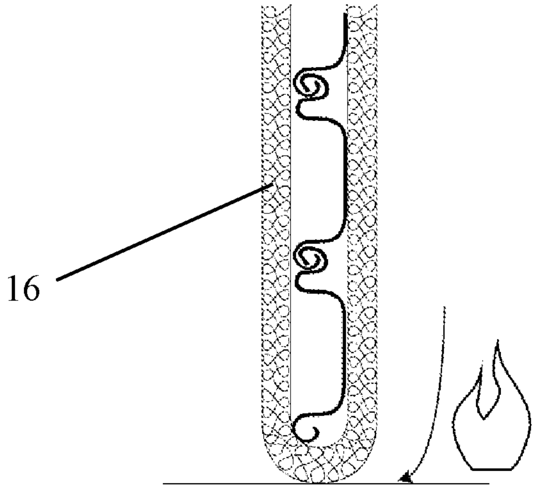
Fig. 4 PRIOR ART
FIG. 4 is a sectional view of the part marked C of the conventional roller shutter of FIG. 1.
Figure 5:
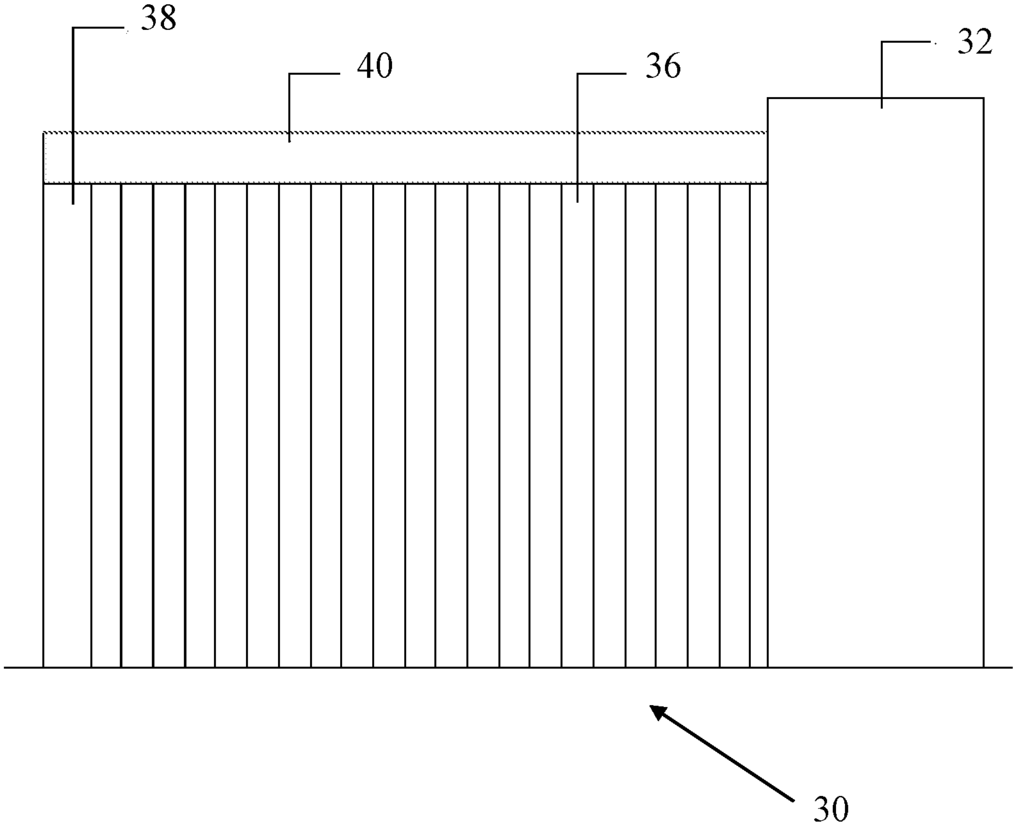
Fig. 5 PRIOR ART
FIG. 5 is a front view of a conventional laterally-sliding roller shutter in which the roller curtain is in a fully extended configuration.
Figure 6:
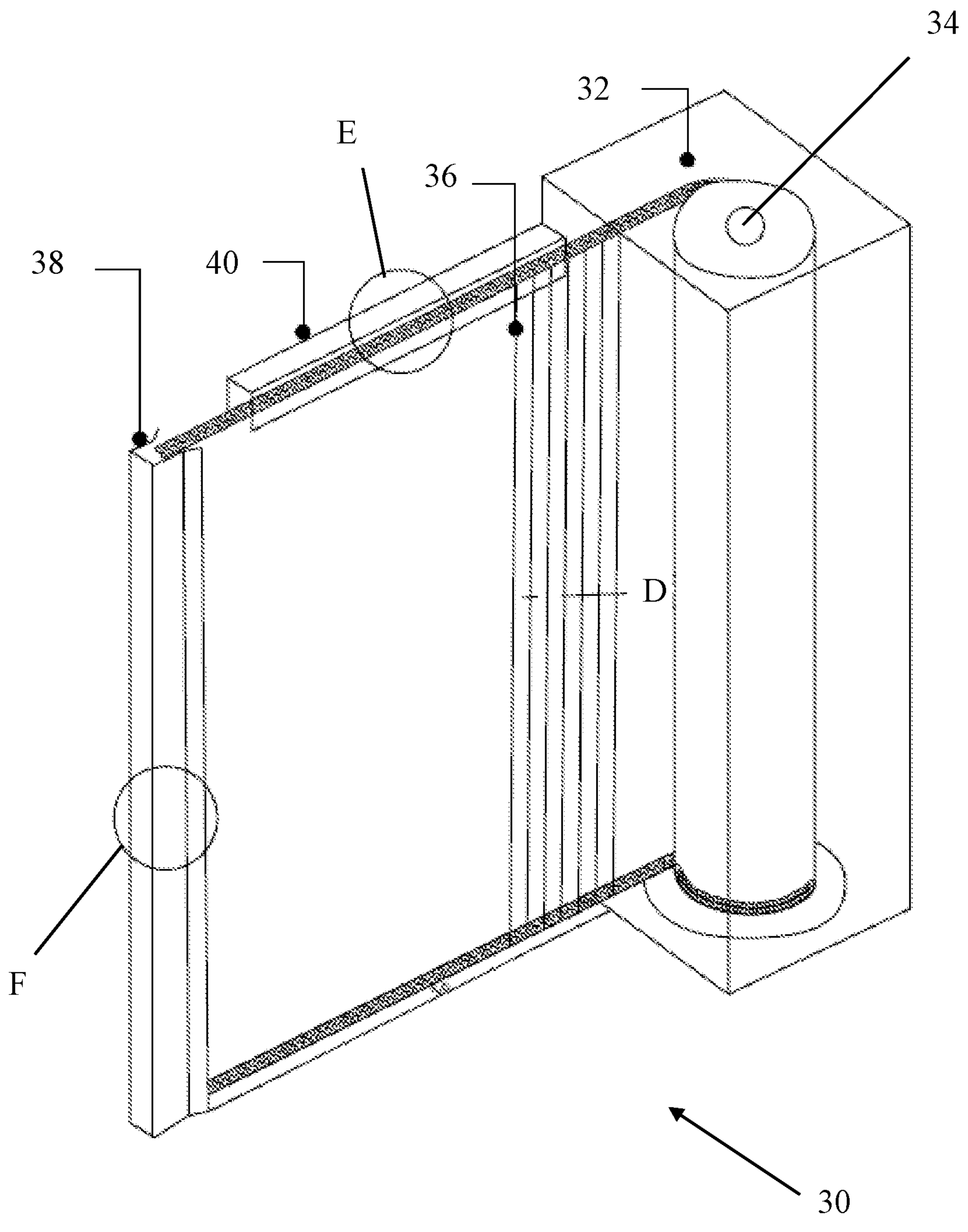
Fig. 6 PRIOR ART
FIG. 6 is a perspective view of the conventional roller shutter of FIG. 5.
Figure 7:
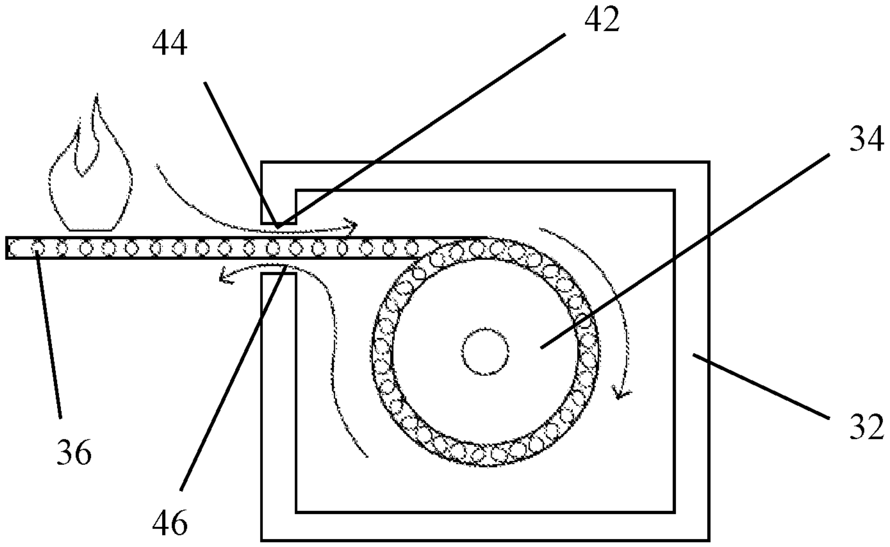
Fig. 7 PRIOR ART
FIG. 7 is a sectional view of the conventional roller shutter across D of FIG. 6.
Figure 8:
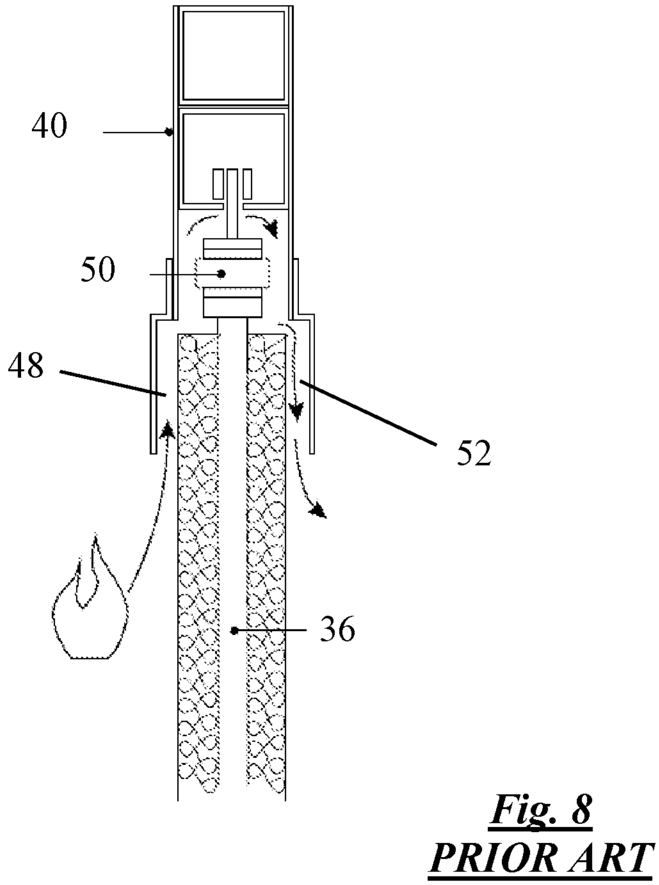
Fig. 8 PRIOR ART
FIG. 8 is a sectional view of the part marked E of the conventional roller shutter of FIG. 6.
Figure 9:
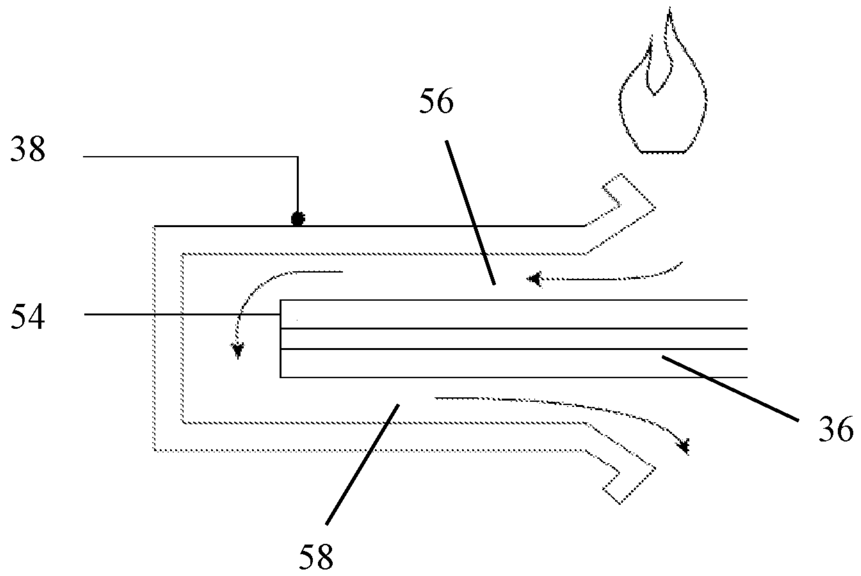
Fig. 9 PRIOR ART
FIG. 9 is a sectional view of the part marked F of the conventional roller shutter of FIG. 6.
Figure 10:
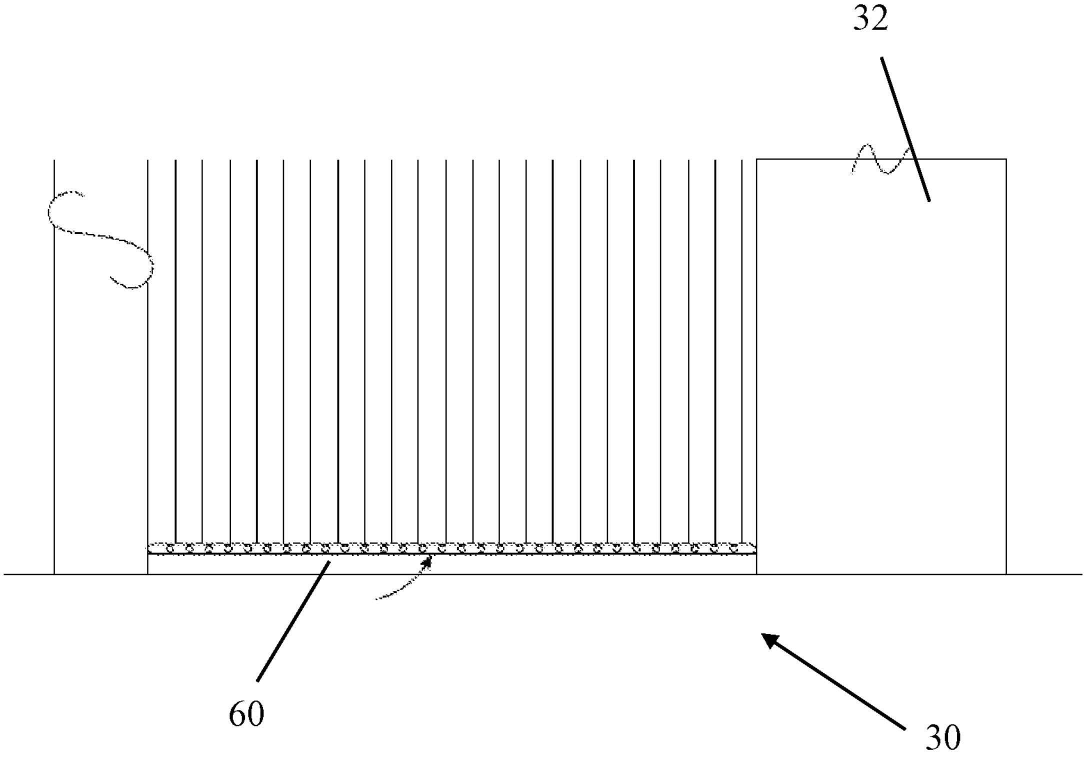
Fig. 10 PRIOR ART
FIG. 10 is a partial front view of the conventional roller shutter of FIG. 5.
Figure 11:
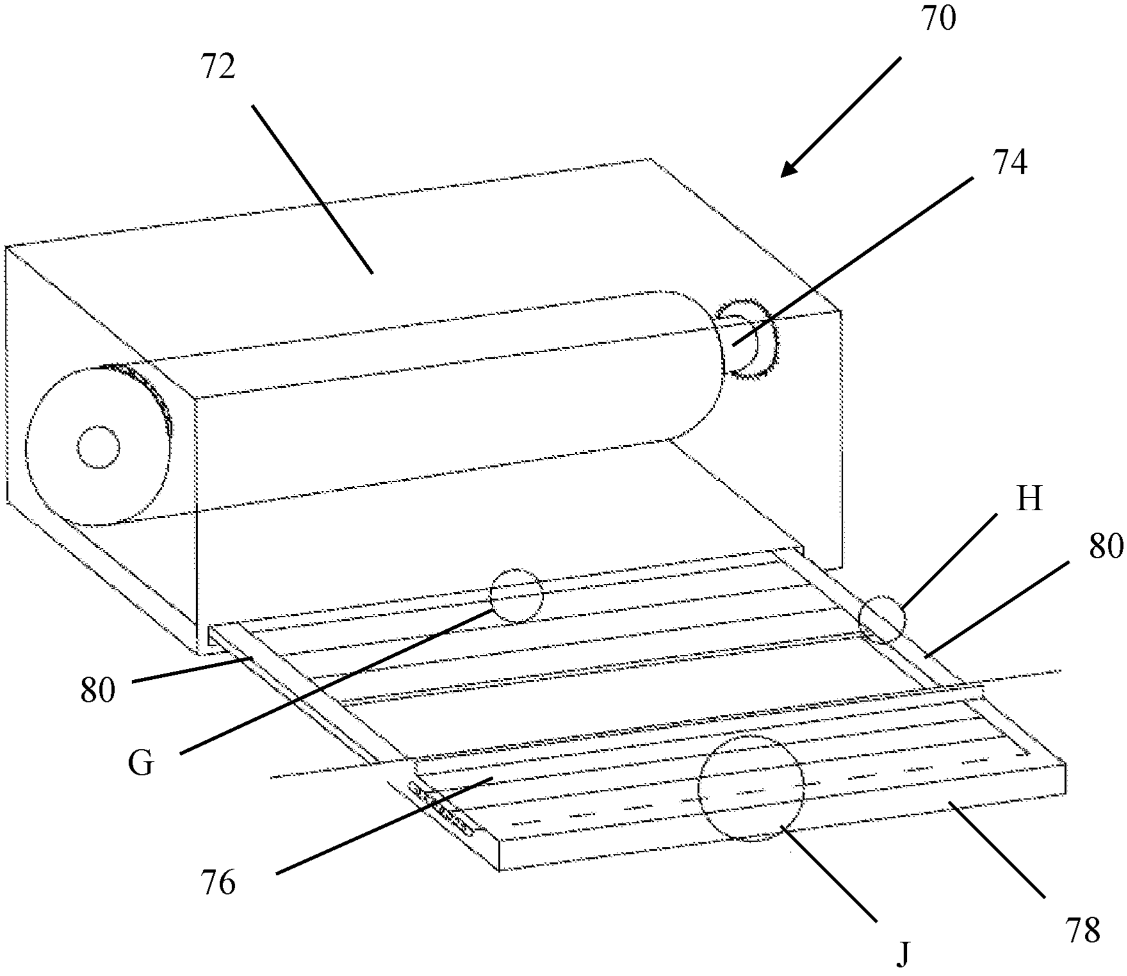
Fig. 11 PRIOR ART
FIG. 11 is a perspective view of a conventional horizontally-sliding roller shutter in which the roller curtain is in a fully extended configuration.
Figure 12:
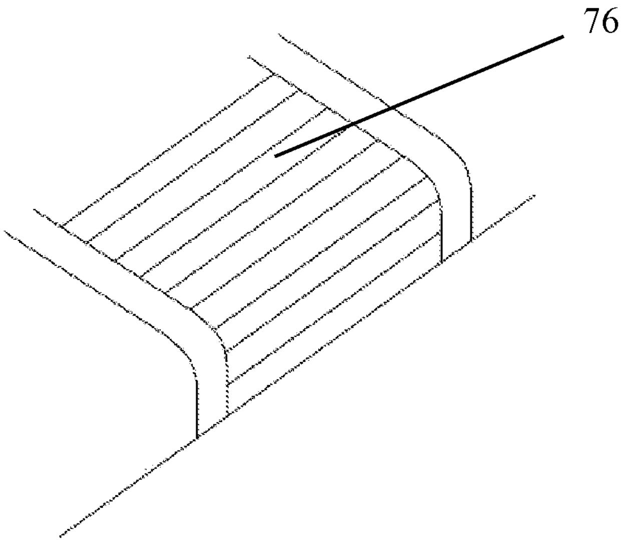
Fig. 12 PRIOR ART
FIG. 12 is a partial perspective view of a conventional horizontally-sliding roller shutter in which the roller curtain is received within the ground.
Figure 13:
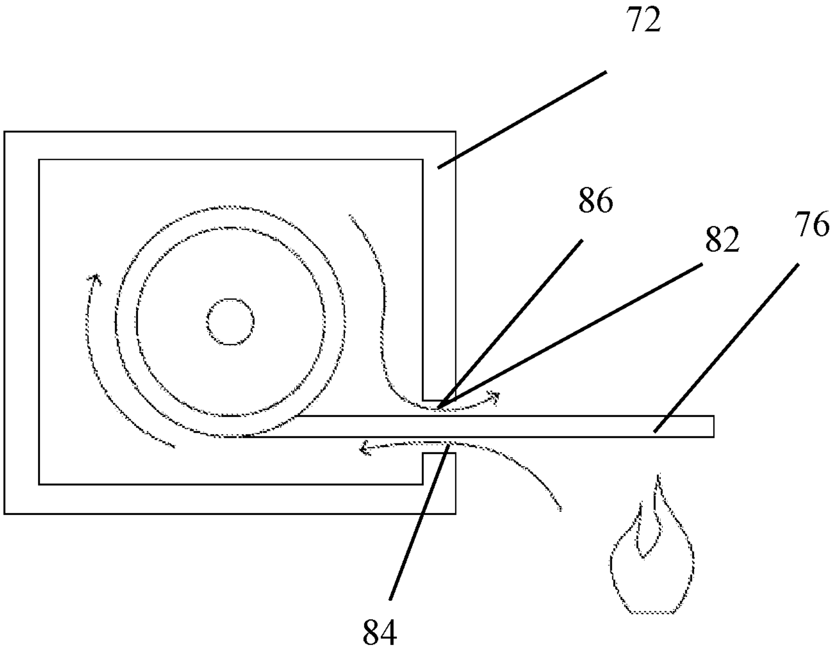
Fig. 13 PRIOR ART
FIG. 13 is a sectional view of the part marked G of the conventional roller shutter of FIG. 11.
Figure 14:
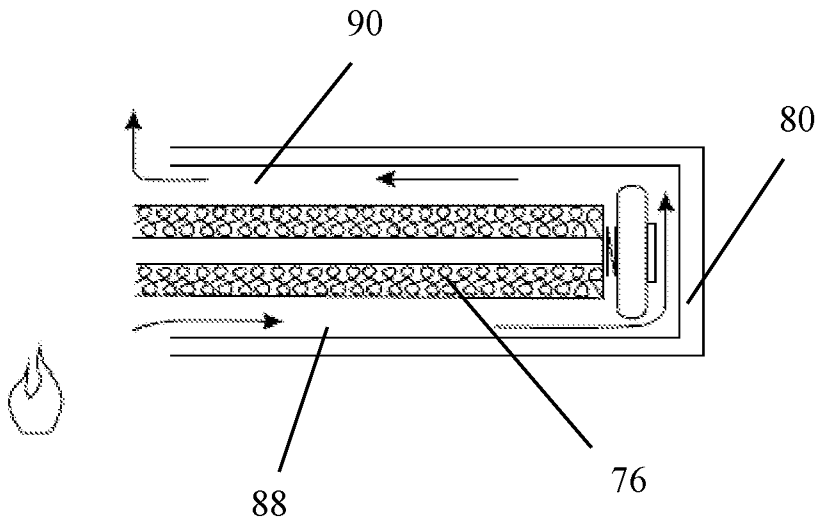
Fig. 14 PRIOR ART
FIG. 14 is a sectional view of the part marked H of the conventional roller shutter of FIG. 11.
Figure 15:
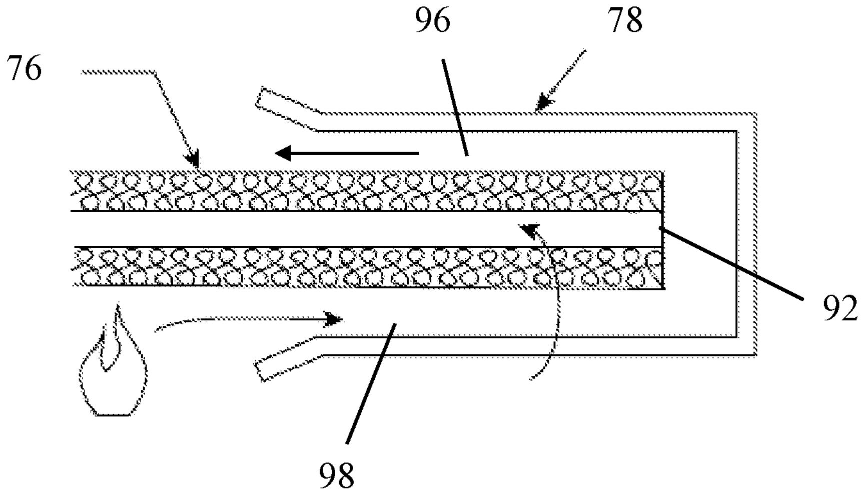
Fig. 15 PRIOR ART
FIG. 15 is a sectional view of the part marked J of the conventional roller shutter of FIG. 11.
Figure 16:
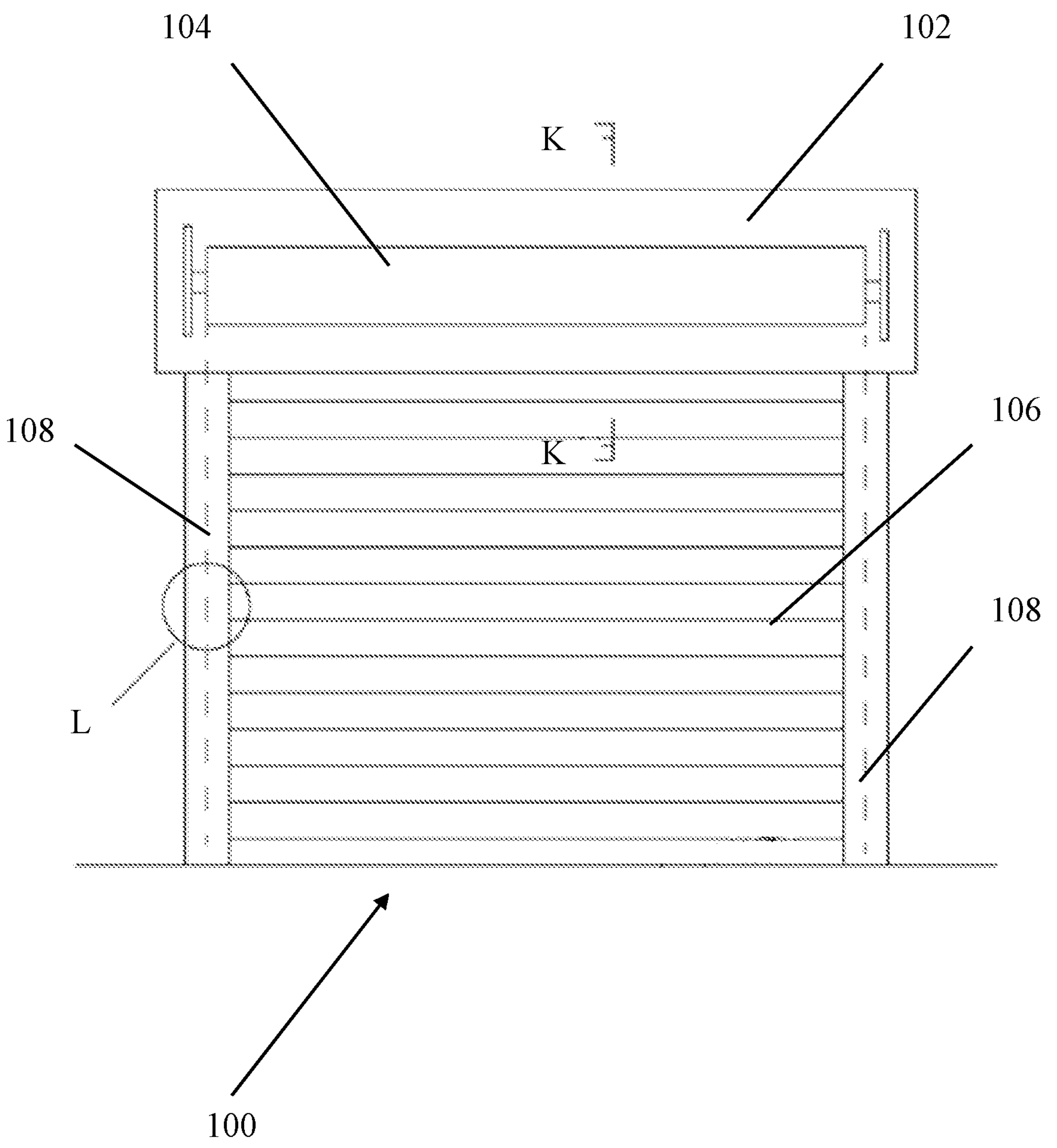
FIG. 16 is a front view of a vertically-sliding roller shutter according to a first embodiment of the present invention in which the roller curtain is in a fully extended configuration.

FIG. 16 shows a front view of a vertically-sliding roller shutter according to an embodiment of the present invention, generally designated as 100, in which its roller curtain 106 is in a fully extended configuration. The outward appearance of the roller shutter 100 is very similar to that of the conventional vertically-sliding roller shutter 10 discussed above. The roller shutter 100 includes a chamber 102 in which an axle 104 is contained. The roller curtain 106 is attached with the axle 104 so that, upon rotation of the axle 104 around its horizontal central longitudinal axis in one direction, the roller curtain 106 is wound around the axle 104 and is thus retracted and contained within the chamber 102 (in which the roller curtain 106 is in a "retracted configuration"), and upon rotation of the axle 104 around its central longitudinal axis in the opposite direction, the roller curtain 106 is unwound from the axle 104 to extend out of the chamber 102 (in which the roller curtain 106 is in an "extended configuration"), until the free end of the roller curtain 106 reaches the floor level (as shown in FIG. 16) (in which the roller curtain 106 is in a "fully extended configuration"), to form a barrier against passage of, e.g. fire and/or smoke, across the lowered roller curtain 106. Movement of the roller curtain 106 among its retracted configuration, extended configuration and fully extended configuration is guided by a pair of vertical guide rails 108 which are parallel to each other.

Figure 17:
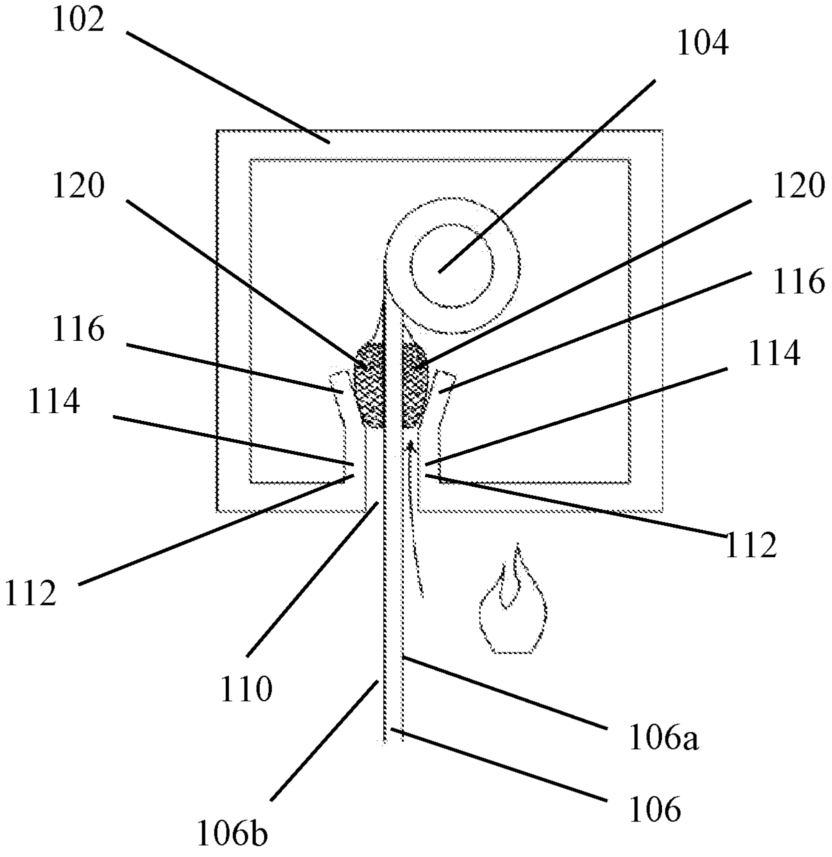
FIG. 17 is a sectional view of the roller shutter across K-K of FIG. 16.

As shown in FIG. 17, which is a sectional view across K-K of the roller shutter 100 shown in FIG. 16, the roller curtain 106 extends through an opening 110 on an underside of the chamber 102. The opening 110 is defined on two sides by a pair of side plates 112 which extend parallel to each other. Each side plate 112 has an outer part 114 and an inner part 116 conjoined with each other. For each side plate 112, the distance between the outer part 114 and the opening 110 is smaller than the distance between the inner part 116 and the opening 110. The inner surfaces of the outer parts 114 of the side plates 112 face each other and are parallel to each other. Each inner part 116 has an inner surface having a free outer edge and an inner edge which is conjoined with the outer part 114. The inner surfaces of the two inner parts 116 of the side plates 112 are inclined relative to each other. In particular, the distance between the free outer edges of the inner part 116 is larger than the distance between the inner edges of the inner part 116.

A blocking part 120 is attached to each of the two major surfaces 106*a*, 106*b* of the roller curtain 106. The blocking parts 120 may be integral with the roller curtain 106, or may be separately formed and subsequently fixedly engaged with the major surfaces 106*a*, 106*b* of the roller curtain 106. The blocking parts 120 are made of a material through which smoke cannot pass.

When the roller curtain 106 is in the extended configuration, and as shown in FIG. 17, the blocking parts 120 are in contact with and sandwiched between the roller curtain 106 and the inner surfaces of the inner parts 116 of the side plates 112, to block and seal the opening 110, so as to prevent (or at least inhibit) passage of smoke into the chamber 102, and thus to prevent (or at least inhibit) the spread of smoke through the chamber 102. More particularly, one of the blocking parts 120 is in contact with and sandwiched between the major surface 106*a* of the roller curtain 106 and the inner surface of the inner part 116 of one of the two side plates 112, and the other blocking part 120 is in contact with and sandwiched between the major surface 106*b* of the roller curtain 106 and the inner surface of the inner part 116 of the other side plate 112.

Figure 18:
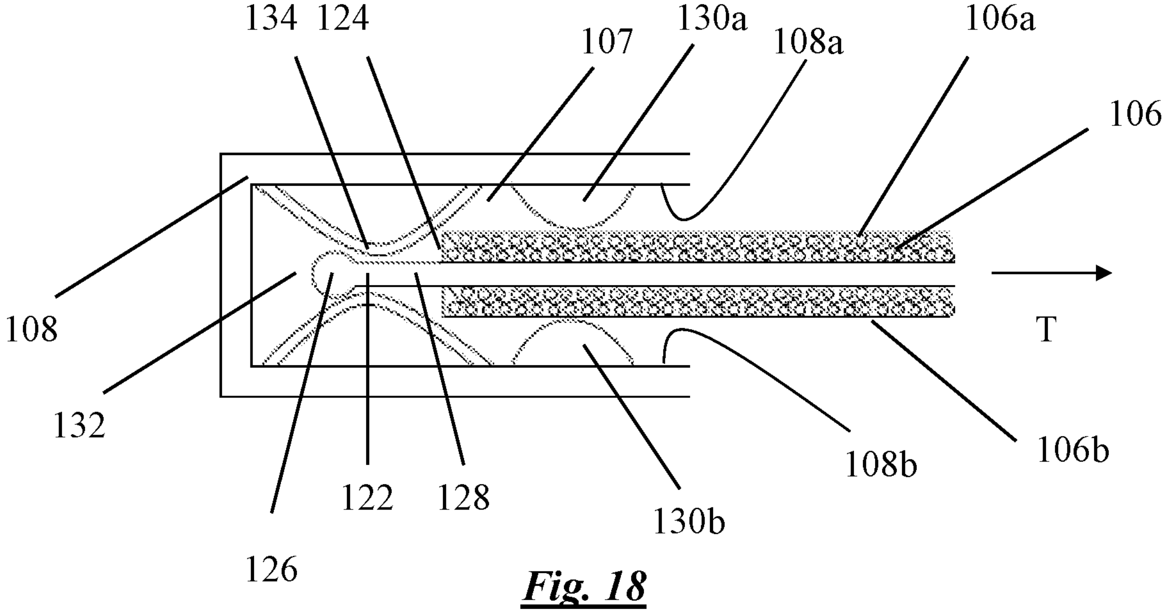
FIG. 18 is a sectional view of the part marked L of the roller shutter of FIG. 16.

As shown in FIG. 18, which is a sectional view of the part marked L of the roller shutter 100 shown in FIG. 16, a part of the roller curtain 106 is received within a space 107 of the vertical guide rail 108. An elongate extension 122 extends from a lateral end 124 of the roller curtain 106. The elongate extension 122 has a lateral end part 126 and an intermediate part 128 between and joining the roller curtain 106 and the lateral end part 126.

The guide rail 108 has two inner surfaces 108*a*, 108*b* facing each other. In addition, the inner face 108*a* of the guide rail 108 faces the major surface 106*a* of the roller curtain 106 and the inner face 108*b* of the guide rail 108 faces the major surface 106*b* of the roller curtain 106. Elongate ribs 130*a*, 130*b* which run parallel to each other and along substantially the whole length of the roller curtain 106 protrude respectively from the inner surfaces 108*a*, 108*b* of the guide rail 108 into the space 107 of the guide rail 108, such that the rib 130*a* is in constant contact with the major surface 106*a* of the roller curtain 106 and the rib 130*b* is in constant contact with the major surface 106*b* of the roller curtain 106.

The ribs 130*a*, 130*b* are of a semi-circular cross section, such that the ribs 130*a*, 130*b* are in contact with the major surfaces 106*a*, 106*b* of the roller curtain 106 along a respective straight line only. Because of such an arrangement, the friction between the roller curtain 106 and the guide rail 108 is relatively small and will not hinder movement of the roller curtain 106 among the retracted configuration, the extended configuration and the fully extended configuration. In addition, the ribs 130*a*, 130*b* and the major surfaces 106*a*, 106*b* of the roller curtain 106 collectively form two seals against passage of smoke there-through, and thus through the guide rail 108. The ribs 130*a*, 130*b* may be made of a metal or metal alloy (e.g. stainless steel).

The guide rail 108 includes an inner space 132 with a narrowed opening 134. The lateral end part 126 of the elongate extension 122 is received within the inner space 132, and the intermediate part 128 is received through the narrowed opening 134. It can be seen that the maximum thickness of the lateral end part 126 (which is here shown as being of a generally circular cross-section) is larger than the width of the narrowed opening 134 and the thickness of the intermediate part 128 is slightly thinner than the width of the narrowed opening 134. By way of such an arrangement, when the lateral end part 126 contacts and is engaged with the narrowed opening 134, such assists in preventing or at least inhibiting passage of smoke through the inner space 132 of the guide rail 108. Such an arrangement also assists in preventing detachment of the roller curtain 106 from the guide rail 108 in a direction indicated by the arrow marked T.

Figure 19:
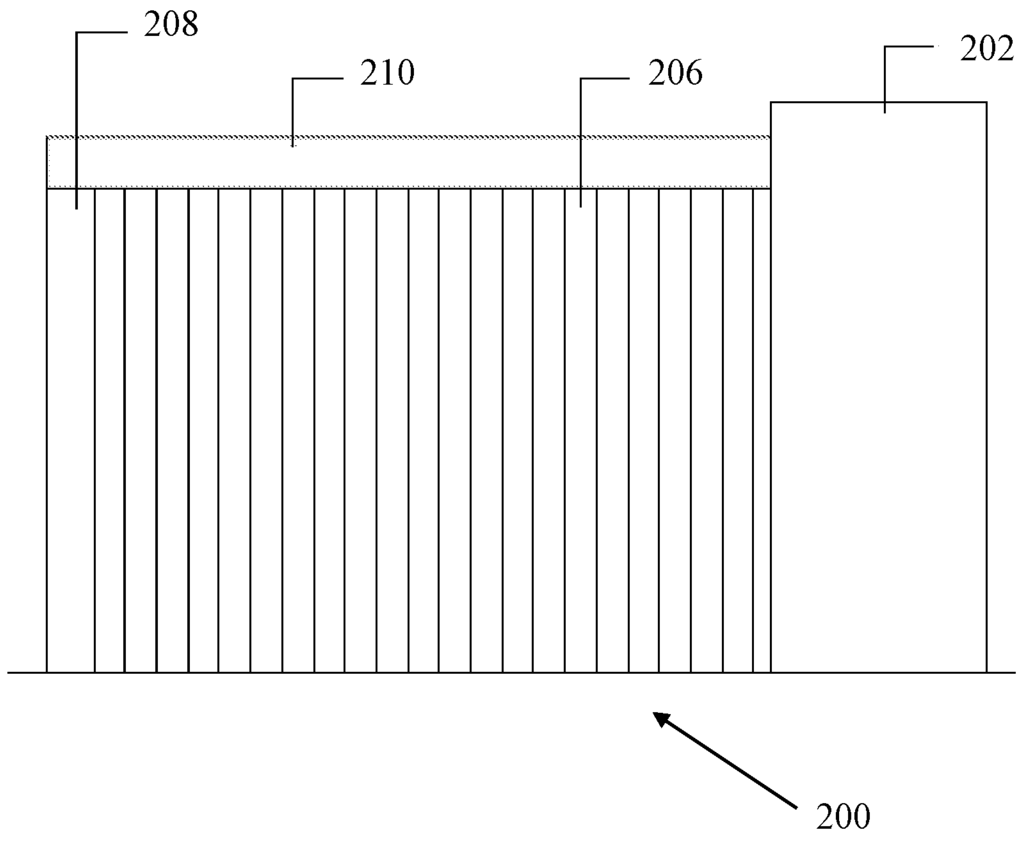
FIG. 19 is a front view of a laterally-sliding roller shutter according to a second embodiment of the present invention in which the roller curtain is in a fully extended configuration.
Figure 20:
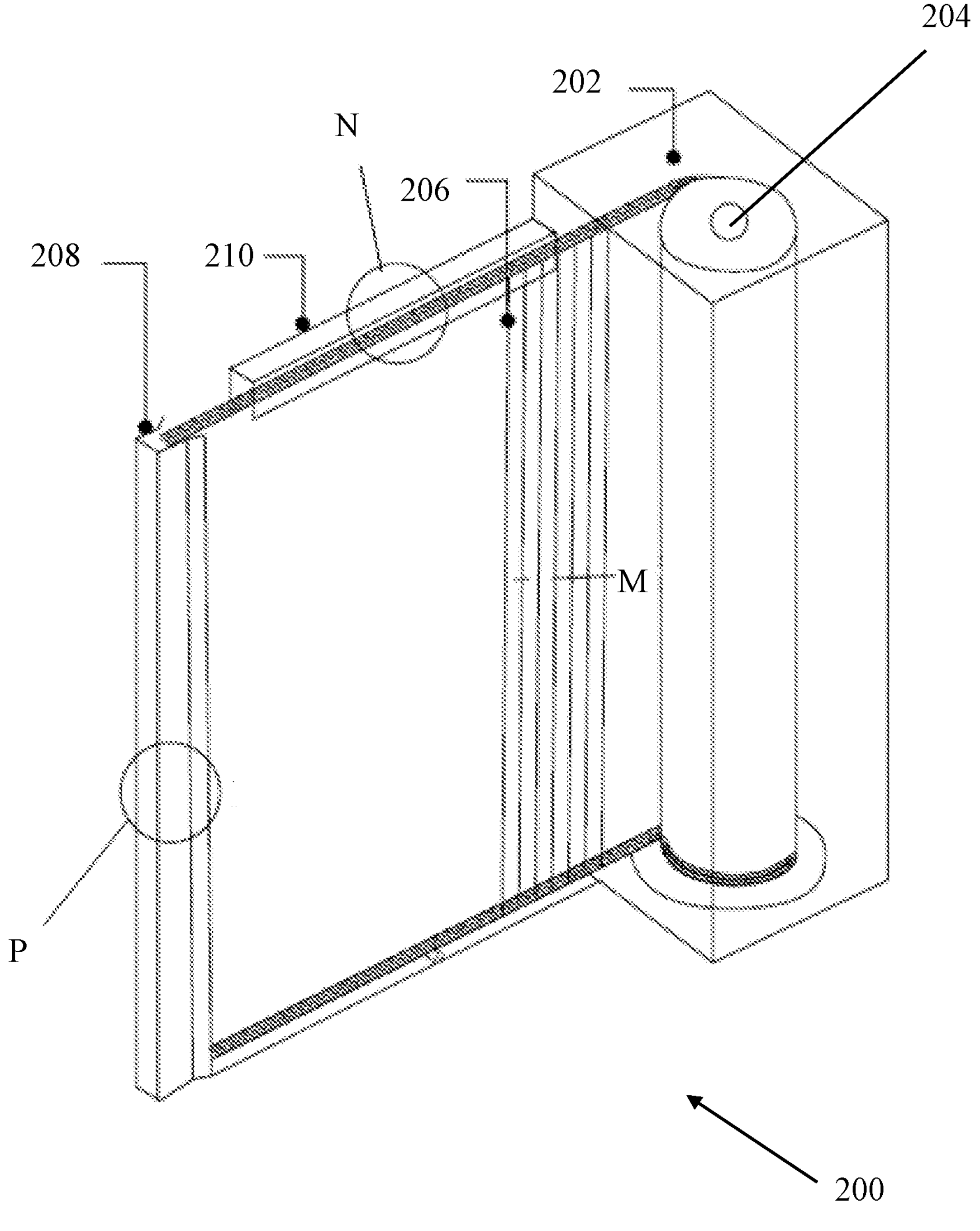
FIG. 20 is a perspective view of the roller shutter of FIG. 19.

FIGS. 19 and 20 show a laterally-sliding roller shutter according to another embodiment of the present invention, generally designated as 200, with its roller curtain 206 in a fully extended configuration. The outward appearance of the roller shutter 200 is very similar to that of the conventional laterally-sliding roller shutter 30 discussed above. This roller shutter 200 includes a chamber 202 in which an axle 204 is contained. The roller curtain 206 is attached with the axle 204 so that, upon rotation of the axle 204 around its vertical central longitudinal axis in one direction, the roller curtain 206 is retracted and contained within the chamber 202 and wound around the axle 204 (in which the roller curtain 206 is in a "retracted configuration"), and upon rotation of the axle 204 around its central longitudinal axis in the opposite direction, the roller curtain 206 is unwound from the axle 204 to extend out of the chamber 202 (in which the roller curtain 206 is in an "extended configuration"), until the free end of the roller curtain 206 is received within a receiving trough 208 (as shown in FIGS. 19 and 20) (in which the roller curtain 206 is in a "fully extended configuration"), to form a barrier against passage of, e.g. fire and/or smoke, across the extended roller curtain 206. Movement of the roller curtain 206 among the retracted configuration, the extended configuration and the fully extended configuration is guided by a horizontal guide rail 210 under and relative to which the roller curtain 206 moves.

Figure 21:
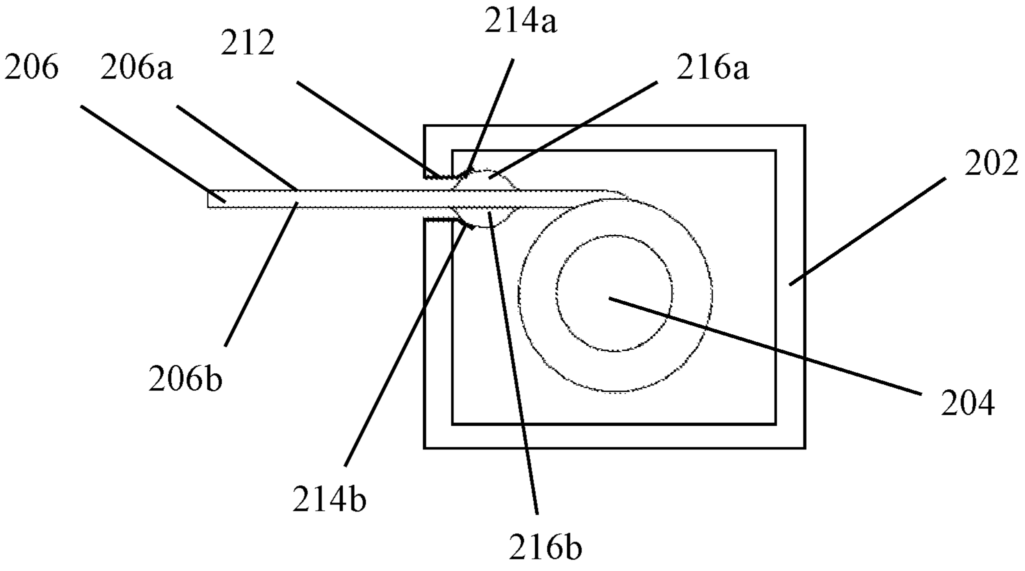
FIG. 21 is a sectional view of the roller shutter across M of FIG. 20.

As shown in FIG. 21, which is a sectional view across M of the roller shutter 200 shown in FIG. 20, the roller curtain 206 extends through an opening 212 on a side of the chamber 202. Two parallel side plates 214*a*, 214*b* extend from the opening 212 into the interior of the chamber 202. The side plates 214*a*, 214*b* have parts which are tapered away from each other. A blocking part 216*a* is attached to a major surface 206*a* of the roller curtain 206, and a blocking part 216*b* is attached to another major surface 206*b* of the roller curtain 206. The blocking parts 216*a*, 216*b* may be integrally formed with the roller curtain 206, or may be separately formed and then fixedly engaged with the respective major surface 206*a*, 206*b* of the roller curtain 206. The blocking parts 216*a*, 216*b* are made of a material through which smoke cannot pass.

When the roller curtain 206 is in the extended configuration, and as shown in FIG. 21, the blocking parts 216*a*, 216*b* are in contact with and sandwiched between the roller curtain 206 and the inner surfaces of the side plates 214*a*, 214*b*, to block and seal the opening 212, so as to prevent (or at least inhibit) passage of smoke into the chamber 202, and thus to prevent (or at least inhibit) the spread of smoke through the chamber 202. It can be seen that the blocking part 216*a* is in contact with and sandwiched between the major surface 206*a* of the roller curtain 206 and the inner surface of the side plate 214*a*, and the blocking part 216*b* is in contact with and sandwiched between the major surface 206*b* of the roller curtain 206 and the inner surface of the side plate 214*b*.

Figure 22:
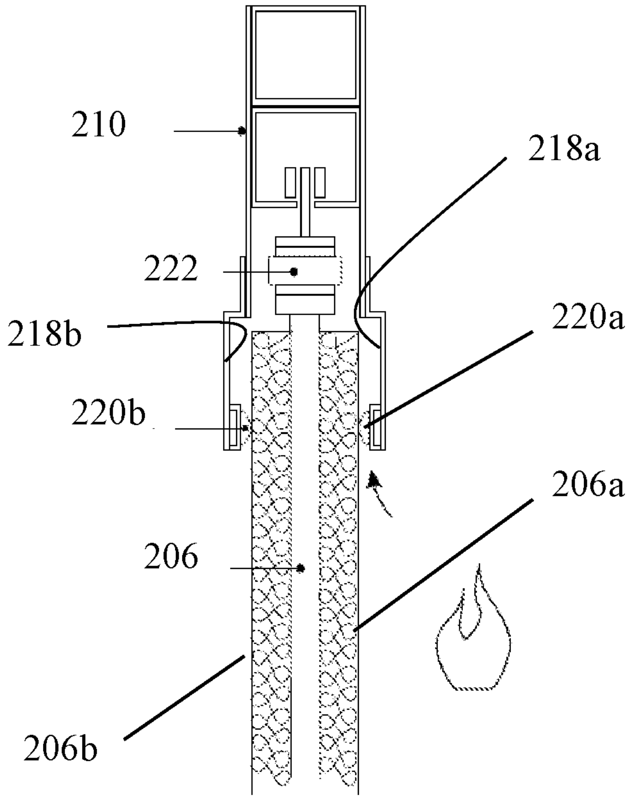
FIG. 22 is a sectional view of the part marked N of the roller shutter of FIG. 20.

FIG. 22 shows an upper part of the roller curtain 206 received within the guide rail 210, in which the arrow shows the direction of flow of smoke from the fire side. The guide rail 210 has two inner surfaces 218*a*, 218*b* facing each other. The inner surface 218*a* faces the major surface 206*a* of the roller curtain 206 and the inner surface 218*b* faces the major surface 206*b* of the roller curtain 206. A horizontal elongate protrusion 220*a* extends from the inner surface 218*a* of the guide rail 210 and contacts the major surface 206*a* of the roller curtain 206, and a horizontal elongate protrusion 220*b* extends from the inner surface 218*b* of the guide rail 210 and contacts the major surface 206*b* of the roller curtain 206. The two protrusions 220*a*, 220*b* are parallel with each other, and are made of a metal or metal alloy (such as stainless steel). The protrusions 220*a*, 220*b* are each of a generally semi-circular cross-section. The protrusions 220*a*, 220*b* and the major surfaces 206*a*, 206*b* of the roller curtain 206 collectively form seals against passage of smoke into and, thus, through the guide rail 210. As the protrusions 220*a*, 220*b* contact the major surfaces 206*a*, 206*b* along a respective line, such would not hinder the movement of the roller curtain 206 relative to the guide rail 210 among the retracted configuration, the extended configuration and the fully extended configuration, as driven by a transmission chain 222.

Figure 23:
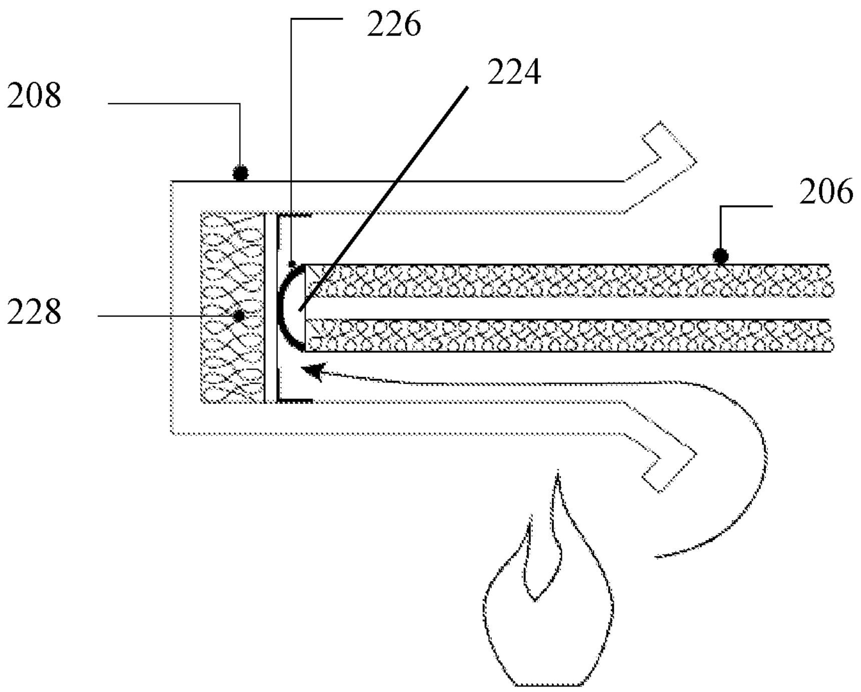
FIG. 23 is a sectional view of the part marked P of the roller shutter of FIG. 20.

Turning to FIG. 23, such shows a free end 224 of the roller curtain 206 received within the receiving trough 208 of the roller shutter 200. The free end 224 of the roller curtain 206 is provided with a vertical elongate protrusion 226 which is made of a metal or metal alloy (e.g. stainless steel). The protrusion 226 is of a generally semi-circular cross section. The part of the receiving trough 208 facing the free end 224 of the roller curtain 206 is provided with a layer of heat-resistant material 228 (e.g. a heat-resistant cloth or fabric). When the roller curtain 206 is in the fully extended configuration, the protrusion 226 contacts the layer of heat-resistant material 228 to form a seal against passage of smoke through the guide rail 208.

Figure 24:
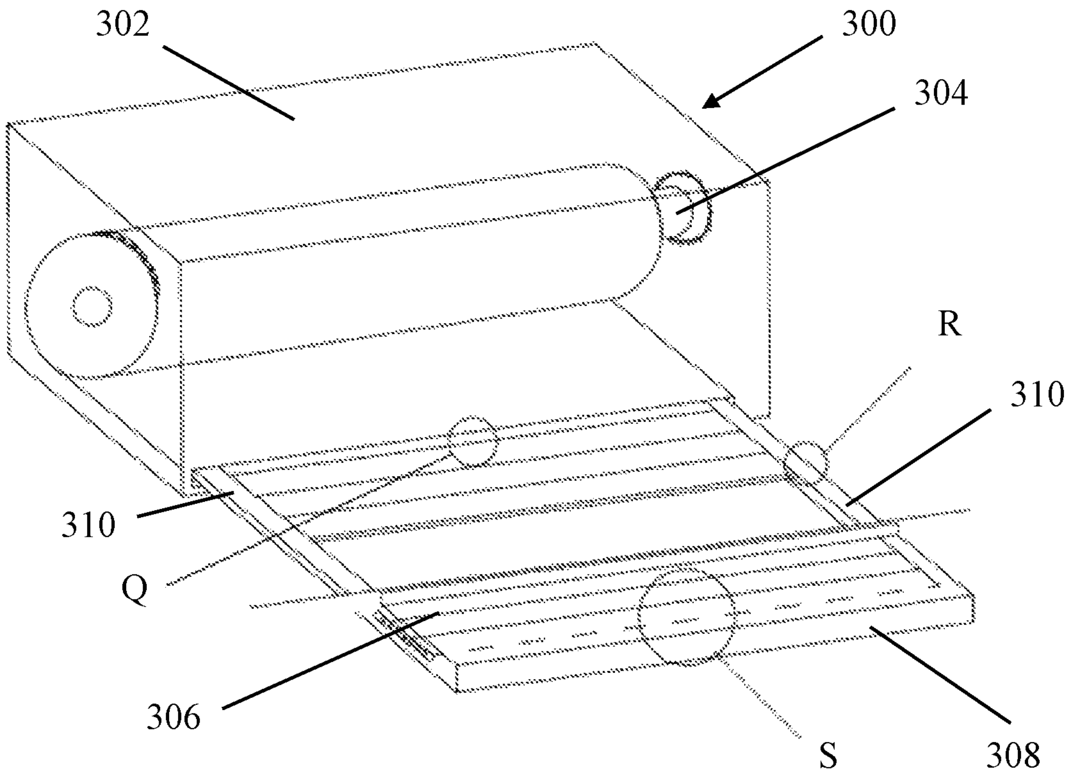
FIG. 24 is a perspective view of a horizontally-sliding roller shutter according to a third embodiment of the present invention in which the roller curtain is in a fully extended configuration.

FIG. 24 shows a horizontally-sliding roller shutter 300 according to a further embodiment of the present invention, in which its roller curtain 306 is in a fully extended configuration. The outward appearance of the roller shutter 300 is very similar to that of the conventional horizontally-sliding roller shutter 70 discussed above. The roller shutter 300 includes a chamber 302 in which an axle 304 is contained. The roller curtain 306 is attached with the axle 304 so that, upon rotation of the axle 304 around its horizontal central longitudinal axis in one direction, the roller curtain 306 is retracted and contained within the chamber 302 and wound around the axle 304 (in which the roller curtain 306 in a "retracted configuration"), and upon rotation of the axle 304 around its central longitudinal axis in the opposite direction, the roller curtain 306 is unwound from the axle 304 to extend out of the chamber 302 (in which the roller curtain 306 is in an "extended configuration") until the free end of the roller curtain 306 is received within a receiving trough 308 (in which the roller curtain 306 is in a "fully extended configuration"), to form a barrier against passage of, e.g. fire and/or smoke, across the fully extended roller curtain 306. Movement of the roller curtain 306 among the retracted configuration, the extended configuration and the fully extended configuration is guided by a pair of horizontal guide rails 310 relative to which the roller curtain 306 moves.

Figure 25:
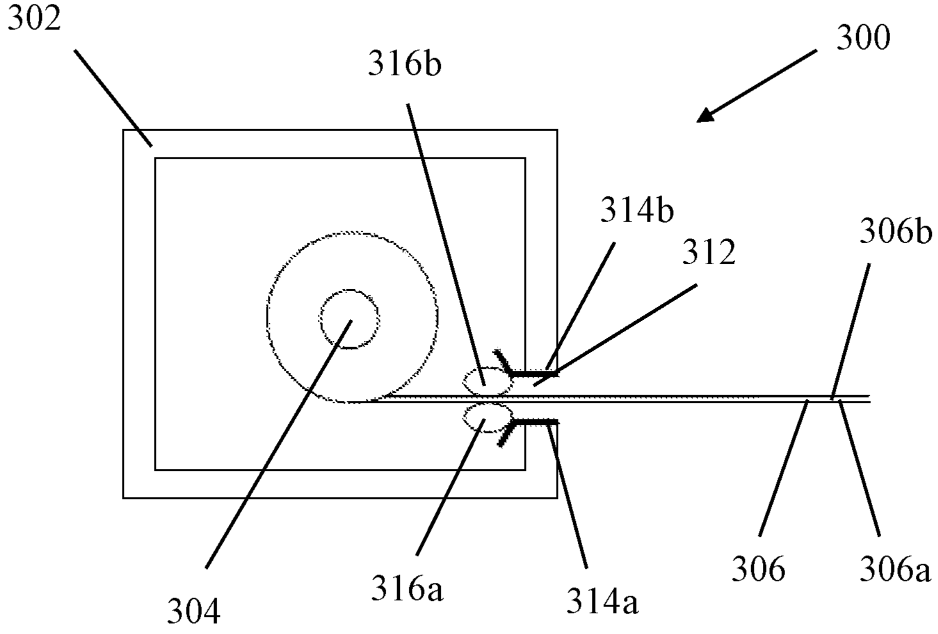
FIG. 25 is a sectional view of the part marked Q of the roller shutter of FIG. 24.

As shown in FIG. 25, which is a sectional view of the part marked Q of the roller shutter 300 shown in FIG. 24, the roller curtain 306 extends through an opening 312 on a side of the chamber 302. Two side plates 314*a*, 314*b* extend from the opening 312 into the interior of the chamber 302. The side plates 314*a*, 314*b* are elongate in shape and extend in parallel with each other along their length. The side plates 314*a*, 314*b* have parts which are tapered away from each other. A blocking part 316*a* is attached to a major surface 306*a* of the roller curtain 306, and another blocking part 316*b* is attached to another major surface 306*b* of the roller curtain 306. The blocking parts 316*a*, 316*b* may be integrally formed with the roller curtain 306, or may be separately formed and then fixedly engaged with the respective major surface 306*a*, 306*b* of the roller curtain 306. The blocking parts 316*a*, 316*b* are made of a material through which smoke cannot pass.

When the roller curtain 306 is in the extended configuration, and as shown in FIG. 25, the blocking parts 316*a*, 316*b* are in contact with and sandwiched between the roller curtain 306 and the inner surfaces of the side plates 314*a*, 314*b*, to block and seal the opening 312, so as to prevent (or at least inhibit) passage of smoke into the chamber 302, and thus to prevent (or at least inhibit) the spread of smoke through the chamber 302. It can be seen that the blocking part 316*a* is in contact with and sandwiched between the major surface 306*a* of the roller curtain 306 and the inner surface of the side plate 314*a*, and the blocking part 316*b* is in contact with and sandwiched between the major surface 306*b* of the roller curtain 306 and the inner surface of the side plate 314*b*.

Figure 26:
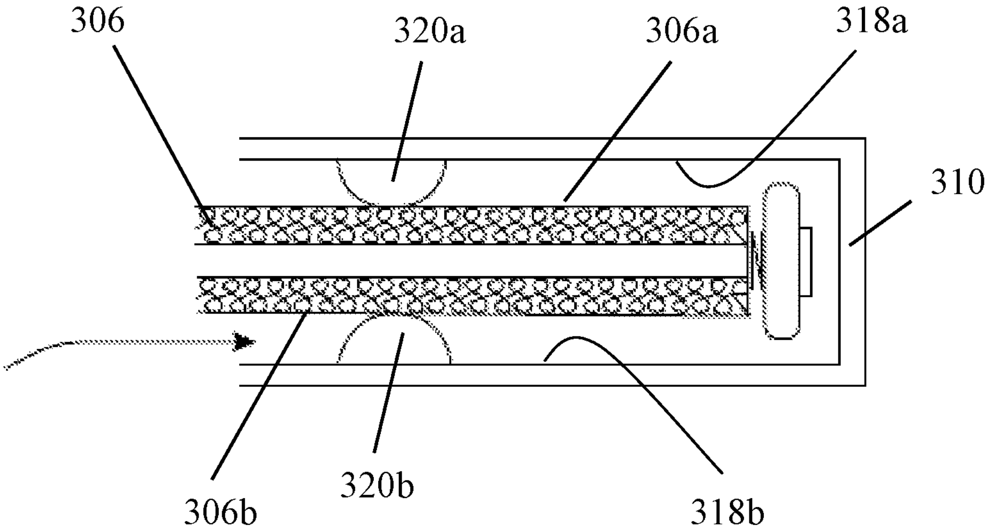
FIG. 26 is a sectional view of the part marked R of the roller shutter of FIG. 24.

FIG. 26 shows a lateral part of the roller curtain 306 received within the guide rail 310, in which the arrow shows the direction of flow of smoke from the fire side. The guide rail 310 has two inner surfaces 318*a*, 318*b* facing each other. The inner surface 318*a* faces the major surface 306*a* of the roller curtain 306 and the inner surface 318*b* faces the major surface 306*b* of the roller curtain 306. A horizontally-extending elongate protrusion 320*a* protrudes from the inner surface 318*a* of the guide rail 310 and contacts the major surface 306*a* of the roller curtain 306, and a horizontally-extending elongate protrusion 320*b* protrudes from the inner surface 318*b* of the guide rail 310 and contacts the major surface 306*b* of the roller curtain 306. The two protrusions 320*a*, 320*b* are parallel with each other, and are made of a metal or metal alloy (such as stainless steel). The protrusions 320*a*, 320*b* are each of a generally semi-circular cross-section. The protrusions 320*a*, 320*b* and the major surfaces 306*a*, 306*b* of the roller curtain 306 collectively form seals against passage of smoke into and, thus, through the guide rail 310. As the protrusions 320*a*, 320*b* contact the major surfaces 306*a*, 306*b* of the roller curtain 306 along a respective line, such would not hinder the movement of the roller curtain 306 relative to the guide rail 310 among the retracted configuration, the extended configuration and the fully extended configuration.

Figure 27:
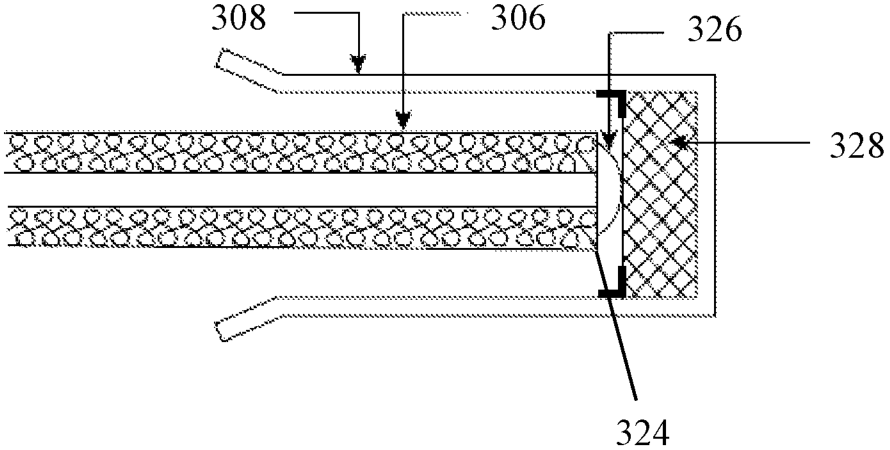
FIG. 27 is a sectional view of the part marked S of the roller shutter of FIG. 24.

Turning to FIG. 27, such shows a free end 324 of the roller curtain 306 received within the receiving trough 308 of the roller shutter 300. The free end 324 of the roller curtain 306 is provided with a horizontal elongate protrusion 326 which is made of a metal or metal alloy (e.g. stainless steel). The protrusion 326 is of a generally semi-circular cross section. The part of the receiving trough 308 facing the free end 324 of the roller curtain 306 is provided with a layer of heat-resistant material 328 (e.g. a heat-resistant cloth or fabric). When the roller curtain 306 is in the fully extended configuration, the protrusion 326 of the free end 324 of the roller curtain 306 contacts the layer of heat-resistant material 328 to form a seal against passage of smoke through the guide rail 308.

Figure 28:
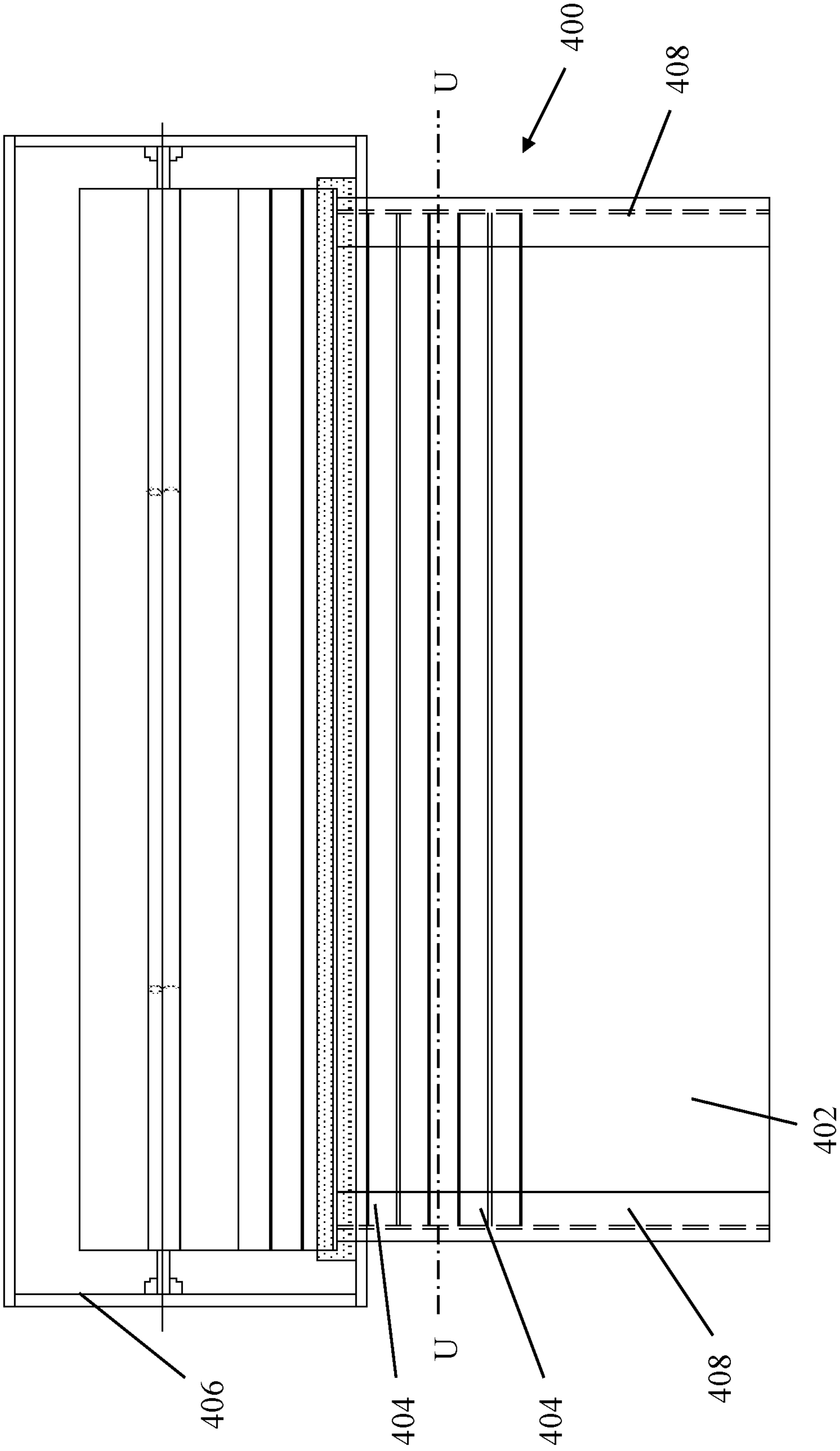
FIG. 28 is a front view of a vertically-sliding roller shutter according to a fourth embodiment of the present invention in which the roller curtain is in an extended configuration.

FIG. 28 shows a front view of a vertically-sliding roller shutter according to a fourth embodiment of the present invention, generally designated as 400, in which a roller curtain 402 formed of a number of interlocking elongate stainless steel slat members 404 extends outward of a chamber 406 through an opening of the chamber 406. The roller curtain 402 is said to be in an extended configuration. When the roller curtain 402 extends into a cavity at or below the floor level (to be discussed below), the roller curtain 402 is said to be in the fully-extended configuration. When the roller curtain 402 is fully (or nearly fully) wound around a barrel (not shown) in the chamber 406, the roller curtain 402 is said to be in a retracted configuration. The slat members 404 are formed of steel, e.g. stainless steel, and are interlocked with each other for relative pivotal movement. The interlocked slat members 404 collectively form two major surfaces which are opposite to each other.

Figure 29:
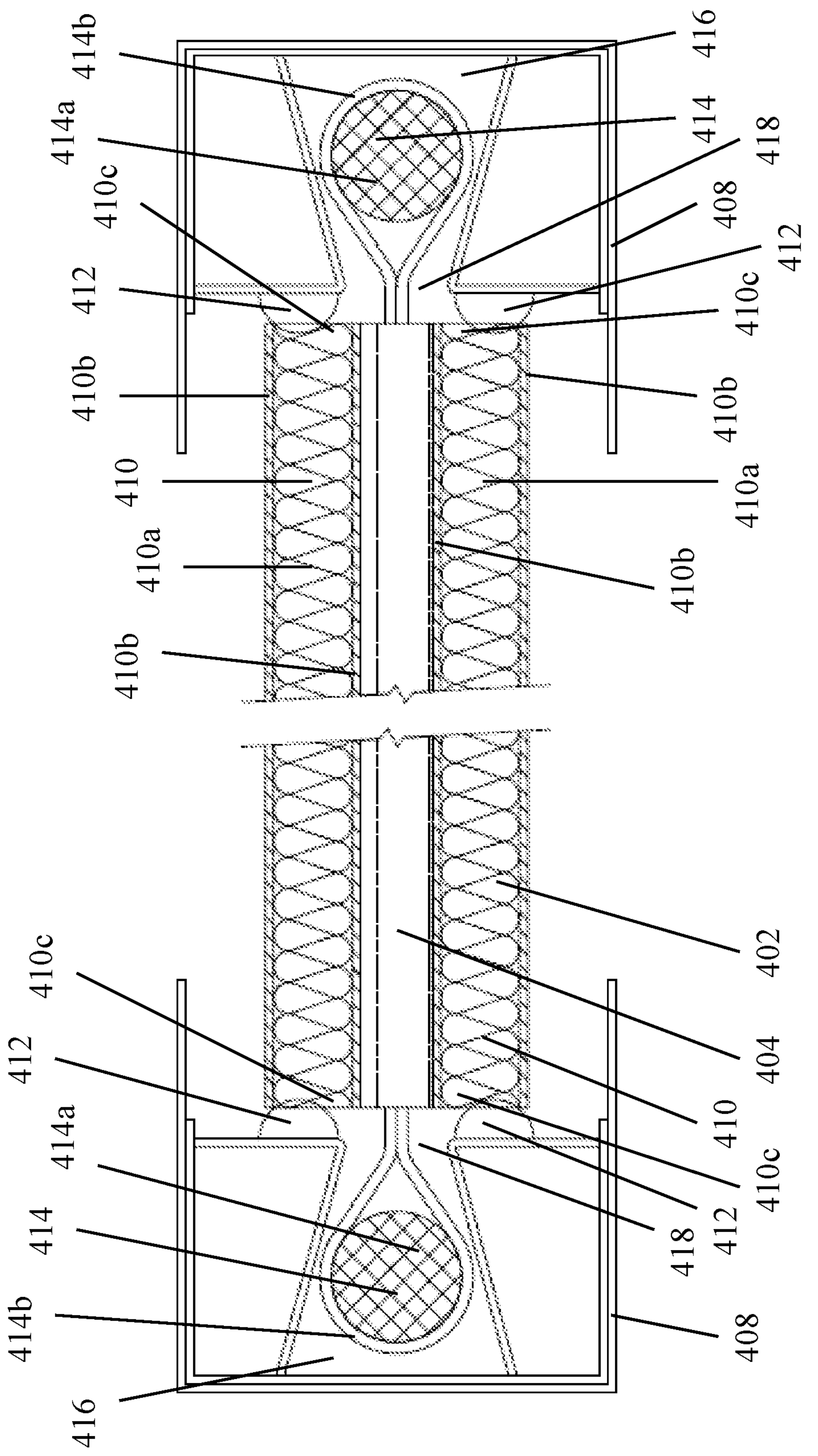
FIG. 29 is a sectional view of the roller shutter across U-U of FIG. 28.

The roller shutter 400 includes a pair of vertical parallel guide rails 408 on either side to guide the movement of the roller curtain 402 amongst the retracted configuration, the extended configuration and the fully-extended configuration. As shown in FIG. 29, on each major surface of the interlocked slat members 404 is fixedly mounted a layer of fire-resistant and/or heat-resistant fabric 410. The layer of fire-resistant and/or heat-resistant fabric 410 includes a layer of fire-resistant and/or heat-resistant padding 410*a* sandwiched between two layers of fire-resistant and/or heat-resistant cloth 410*b*.

Along the length of each of the guide rails 408 run two parallel elongate semi-cylindrical stainless steel protrusions 412, each of which contacting or pressing into the layer of fire-resistant and/or heat-resistant padding 410*a* of the layer of fire-resistant and/or heat-resistant fabric 410 so as to form a respective elongate seal which prevents, or at least hinders, the passage of smoke there-through. The protrusions 412 may be of a radius of around 5 mm. FIG. 29 shows at least four such elongate seals thus formed in the roller shutter 400. It can be seen that the protrusions 412 contact the layers of fire-resistant and/or heat-resistant fabric 410 at locations other than a major surface of the layers of fire-resistant and/or heat-resistant fabric 410 to form the seals. In particular, as shown in FIG. 29, the protrusions 412 contact or press into side edges 410*c* of the layers of fire-resistant and/or heat-resistant fabric 410 (e.g. by contacting or pressing into side edge of the layer of fire-resistant and/or heat-resistant padding 410*a*) to form the elongate seals.

Along each side of the roller curtain 402 is engaged with an elongate member 414 for simultaneous movement, the elongate member 414 having a cylinder of ceramic fiber 414*a* wrapped around by a piece of ceramic fiber cloth 414*b*.

Each elongate member 414 is received within an elongate trough 416 within and parallel to the guide rail 408, the trough 416 having an opening 418 facing a side edge of the layer of fire-resistant and/or heat-resistant fabric 410, and two opposite wall surfaces 420 (see FIGS. 30A and 30B) which are inclined relative to each other. During movement of the roller curtain 402 amongst the various configurations, each of the elongate members 414 simultaneously moves within, along and relative to the respective trough 416. The elongate member 414 is of a diameter wider than the opening 418 of the trough 416, such that detachment of the elongate member 414 from the trough 416 in a direction perpendicular to the length of the elongate member 414 (and perpendicular to the length of the trough 416) is prevented.

Figure 30A:
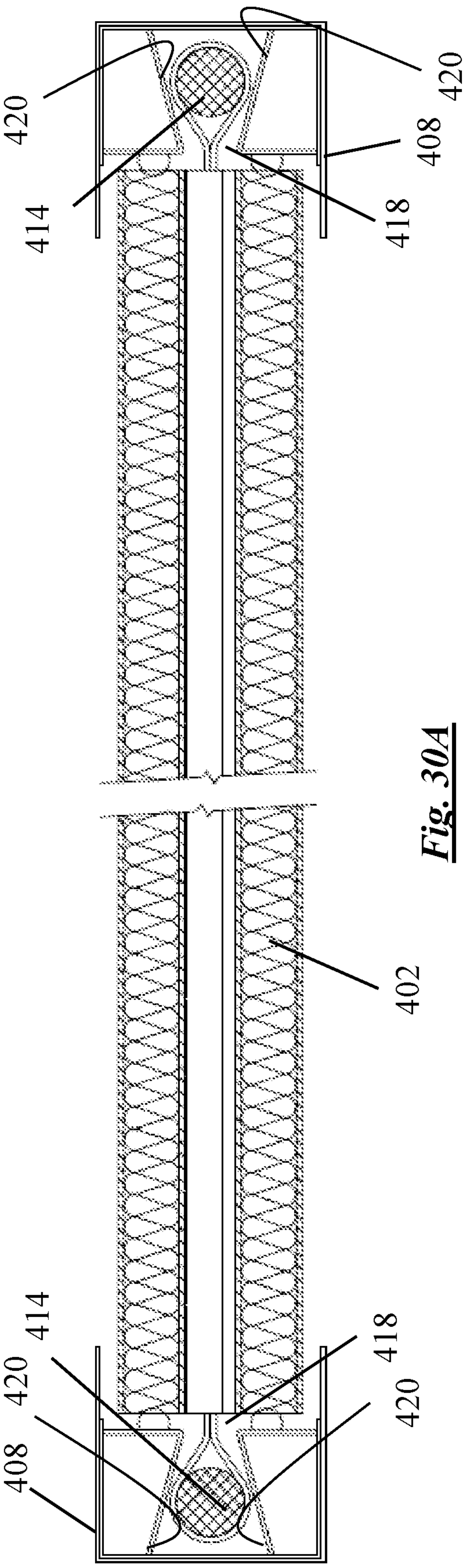
FIG. 30A is a sectional view of the roller shutter across U-U of FIG. 28 in a normal configuration.
Figure 30B:
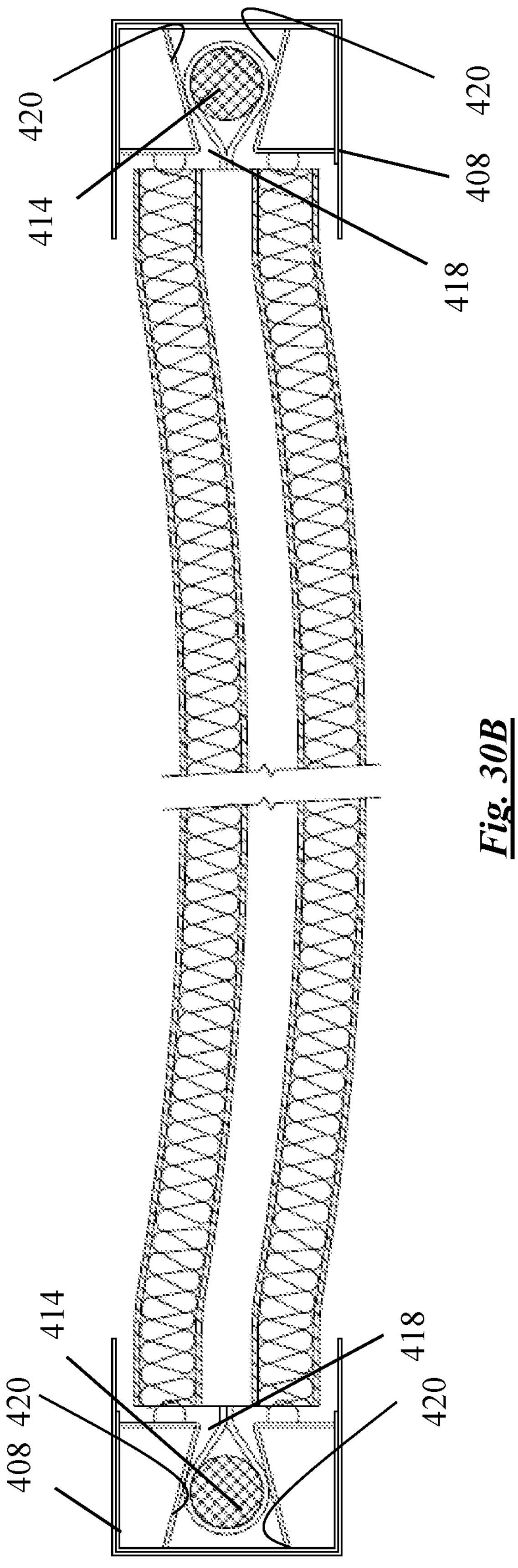
FIG. 30B is a sectional view of the roller shutter across U-U of FIG. 28 in a bent configuration.

FIG. 30A shows a sectional view of the roller shutter 400 across U-U of FIG. 28 in a normal configuration, and FIG. 30B shows a sectional view of the roller shutter 400 across U-U of FIG. 28 in a bent configuration. The bending of the roller shutter 400 may be due to a fire side of the roller curtain 402 being subjected to a higher temperature, or due to the difference in air pressure between a fire side and a non-fire side of the roller curtain 402. Due to the bending of the roller curtain 402, the roller curtain 402 tends to pull the elongate members 414 towards the opening 418 of the trough 416 in which the respective elongate member 414 is received. While detachment of the elongate members 414 from the respective trough 416 is prevented, such movement brings each of the elongate members 414 into close contact with the two wall surfaces 420 of each respective trough 416 to form two elongate seals which prevent, or at least hinder, the passage of smoke there-through.

It can thus be seen that, when a fire breaks out, there are a total of eight elongate seals in the roller shutter 400 for preventing, or at least hindering, the passage, and thus spread, of smoke from one side of the roller shutter 400 to the other side of the roller shutter 400, in particular from the fire side to the non-fire side of the roller shutter 400.

Figure 31:
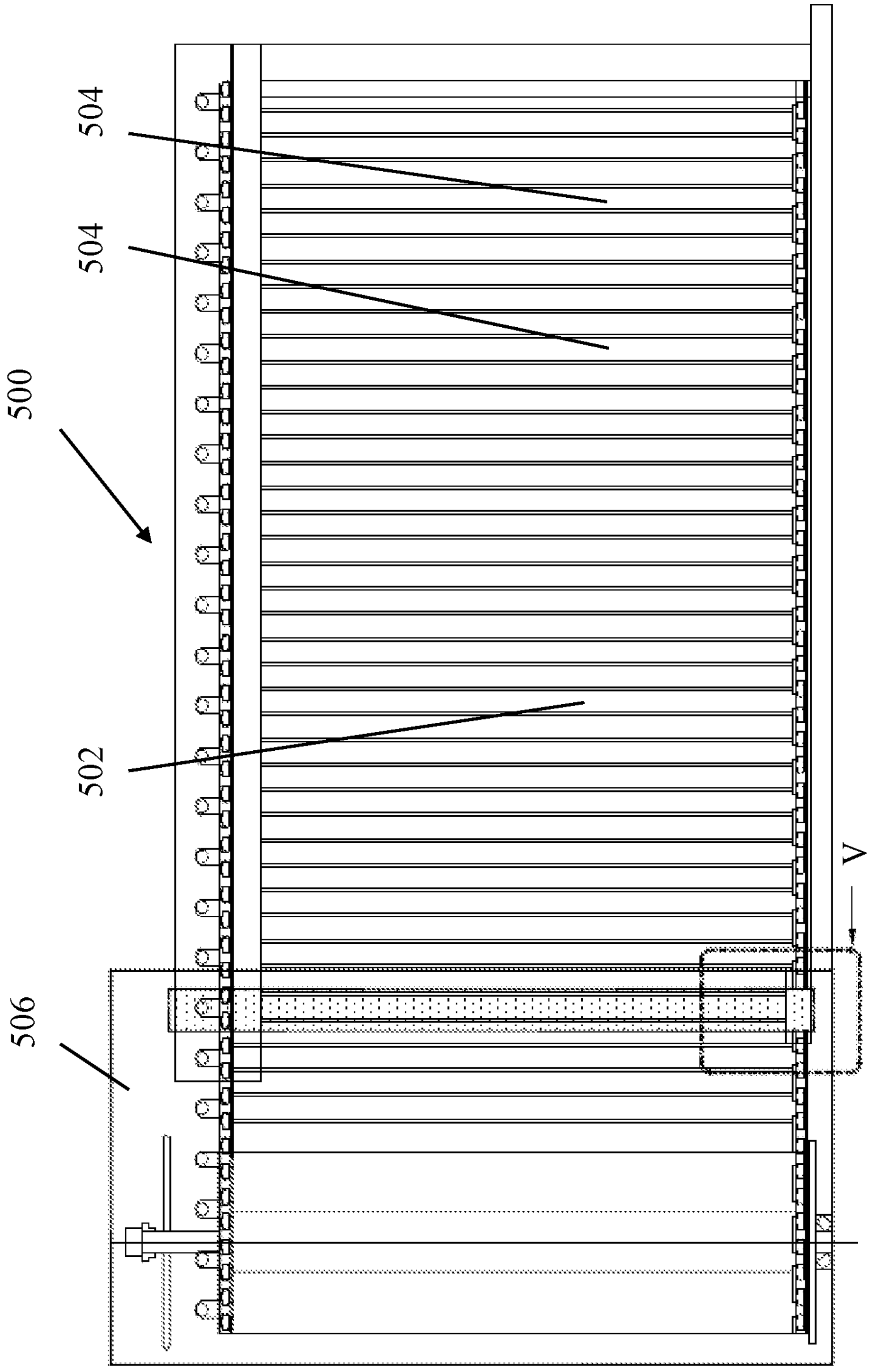
FIG. 31 is a front view of a laterally-sliding roller shutter according to a fifth embodiment of the present invention in which the roller curtain is in a fully extended configuration.
Figure 32:
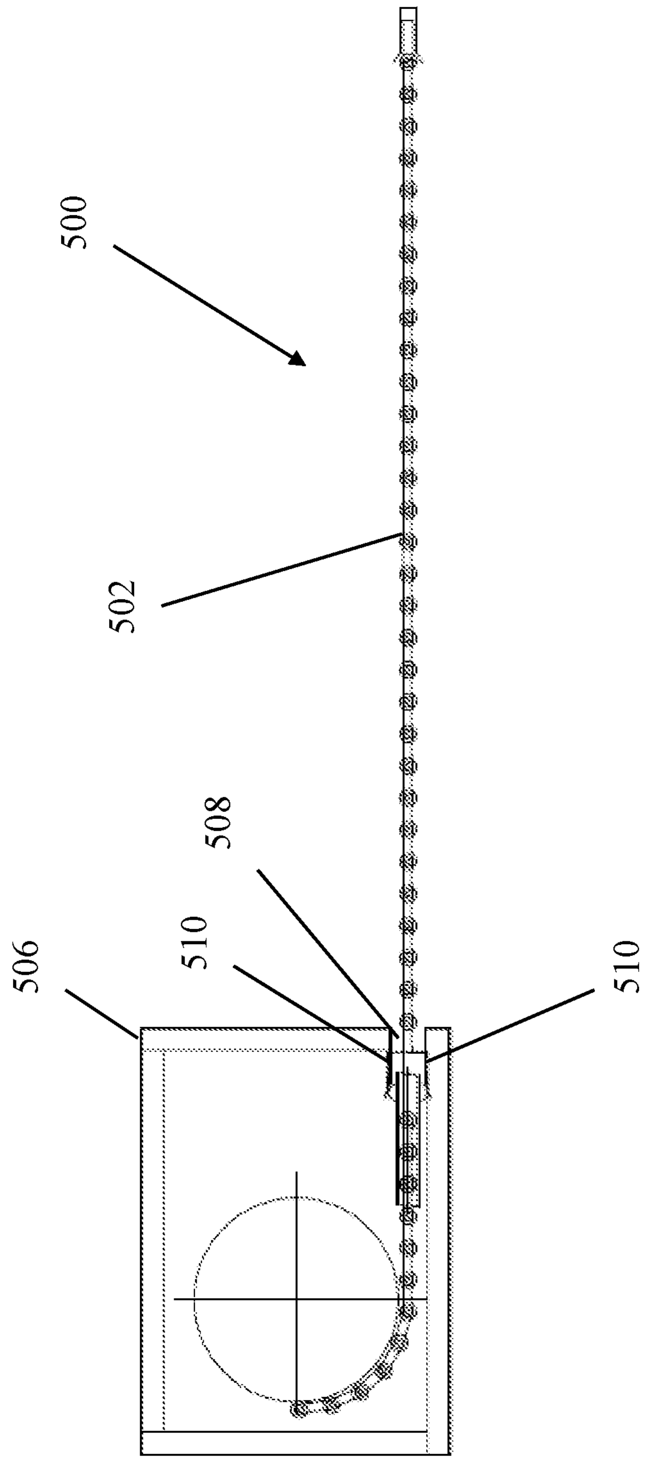
FIG. 32 is a horizontal sectional view of the roller shutter of FIG. 31.
Figure 33A:
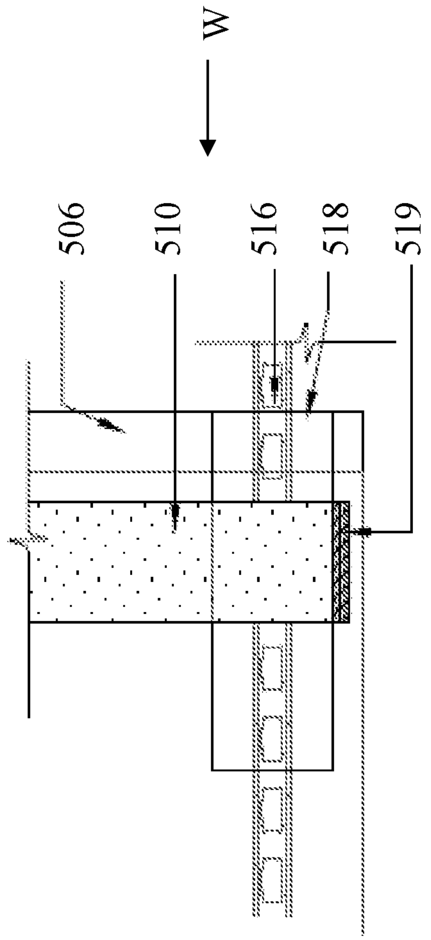
FIG. 33A is an enlarged view of the part marked V of the roller shutter of FIG. 31.
Figure 33B:
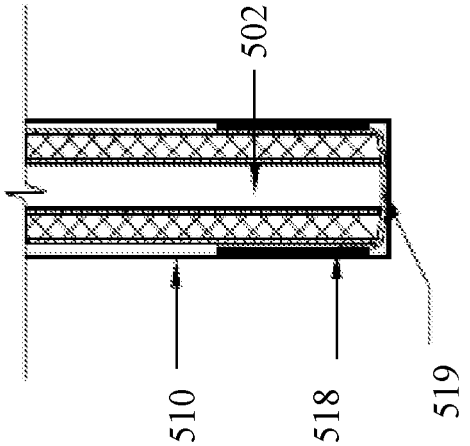
FIG. 33B is a view of the part of the roller shutter shown in FIG. 33A when viewed in the direction indicated by the arrow W.
Figure 34:
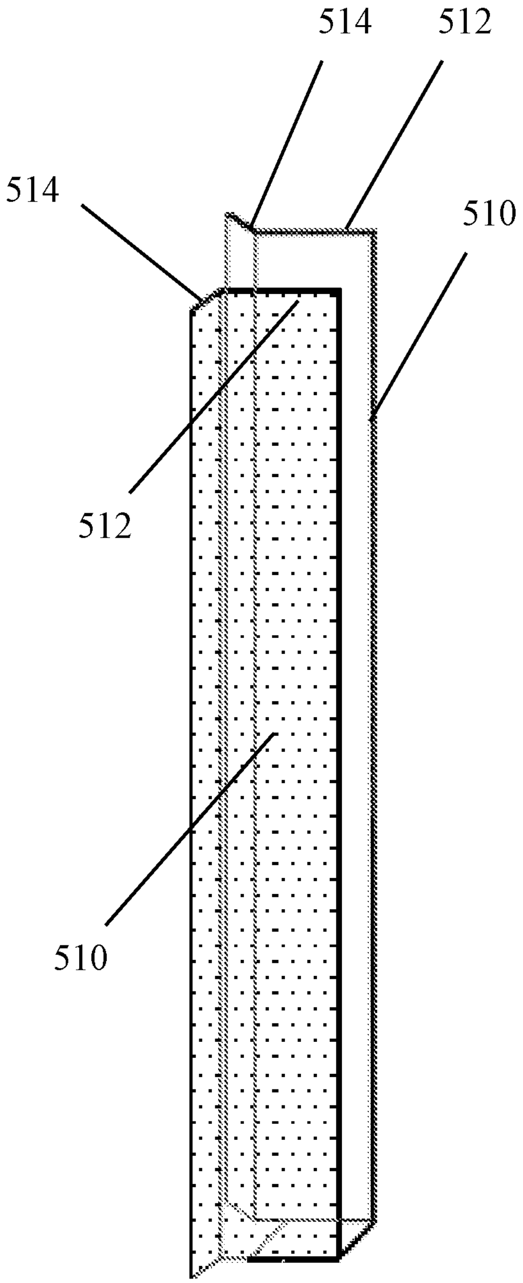
FIG. 34 is a perspective view of the pair of fire barrier sheets shown in FIG. 33A.

FIG. 31 shows a front view of a laterally-sliding roller shutter according to a fifth embodiment of the present invention, generally designated as 500, in which a roller curtain 502 formed of a number of interlocking elongate stainless steel slat members 504 extends outward of a chamber 506 through an opening 508 of the chamber 506 (see FIG. 32). As shown more clearly in FIGS. 33A, 33B and 34, slightly inward of the opening 508 of the chamber 506 are two vertical elongate fire barrier sheets 510. A layer of ceramic fabric cloth 519 is provided at the lower end of each of the fire barrier sheets 510. When viewed from above, the two fire barrier sheets 510 have two parallel edges 512 and two inclined edges 514 which lead into the cavity of the chamber 506. The two inclined edges 514 diverge from the two parallel edges 512. The roller curtain 502 is driven by a roller chain 516 to move along a bottom track 518 amongst the retracted configuration, the extended configuration and fully-extended configuration. When the roller curtain 502 is in the fully-extended configuration, a free end (to be discussed below) of the roller curtain 502 is received within an end trough (to be discussed below) of the roller shutter 500, and a piece of elongate ceramic fabric cloth 520 carried by the roller curtain 502 is jammed between the space between one of the inclined edges 514 and the roller curtain 502, and another piece of elongate ceramic fabric cloth 520 carried by the roller curtain 502 is jammed between the space between the other of the inclined edges 514 and the roller curtain 502, to prevent further outward movement of the roller curtain 502 from the chamber 506 and to form seals which prevent, or at least hinder, the passage of smoke there-through.

Figure 35:
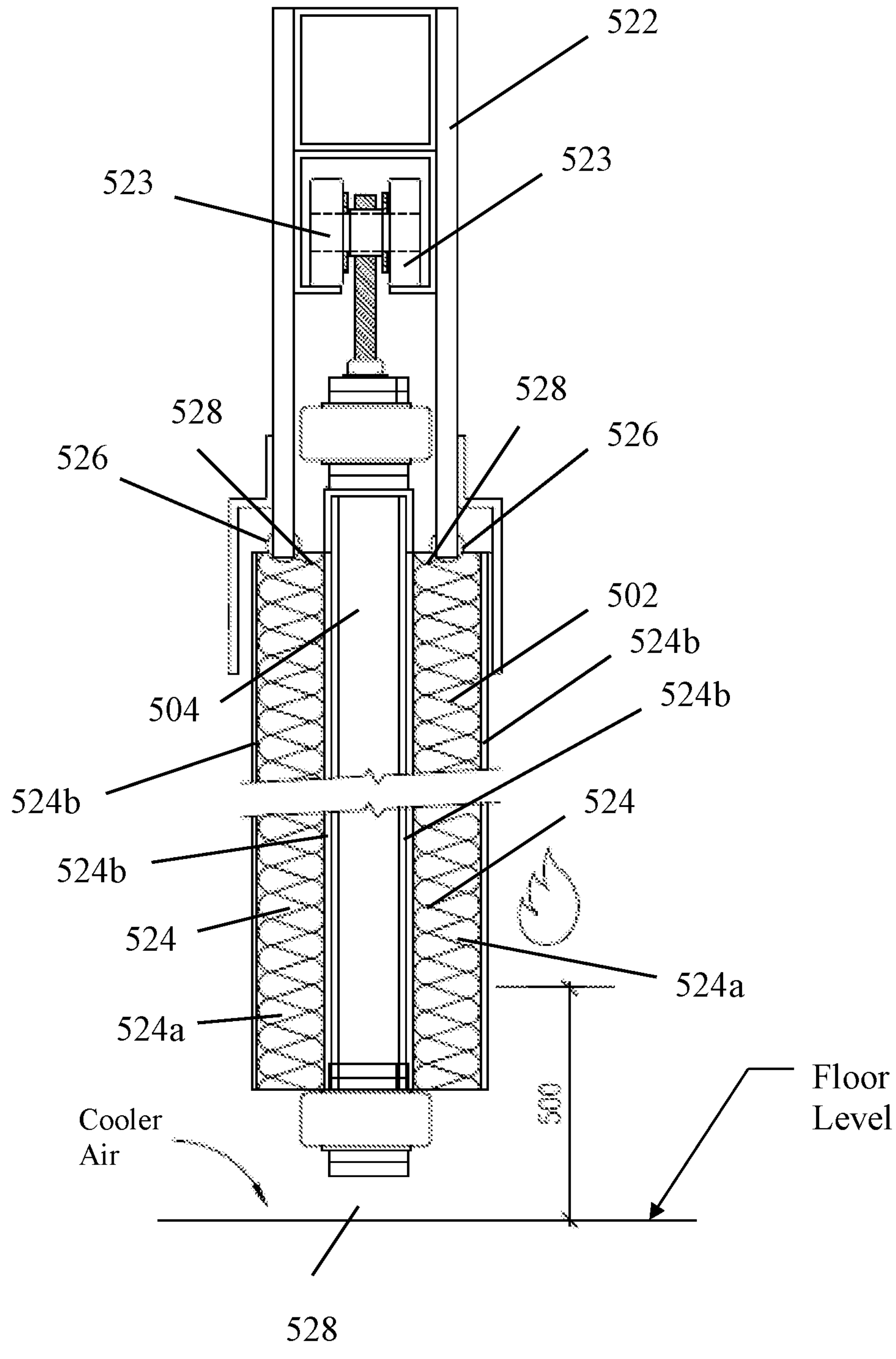
FIG. 35 is a vertical sectional view of the roller shutter of FIG. 31.

FIG. 35 shows a partial sectional view of the laterally-sliding roller shutter 500. The roller shutter 500 has an upper guide rail 522 along and relative to which bearings 523 carried by the roller curtain 502 are rotatable to move the roller curtain 502 amongst the retracted configuration, extended configuration and fully-extended configuration. As in the case of the roller shutter 400 discussed above, the interlocking elongate stainless steel slat members 504 collectively form two opposite major surfaces. On each major surface of the interlocking slat members 504 is fixedly mounted a layer of fire-resistant and/or heat-resistant fabric 524. Each layer of fire-resistant and/or heat-resistant fabric 524 includes a layer of fire-resistant and/or heat-resistant padding 524*a* sandwiched between two layers of fire-resistant and/or heat-resistant cloth 524*b*.

Two parallel elongate cylindrical stainless steel members 526 depend downwardly from the guide rail 522 and extend horizontally in parallel to the guide rail 522. The elongate cylindrical stainless steel members 526 may be of a diameter of around 10 mm. When the roller curtain 502 moves amongst the retracted configuration, extended configuration and fully-extended configuration, each of the elongate cylindrical members 526 contacts and presses into a top edge 528 of a respective fire-resistant and/or heat-resistant padding 524*a* of the layer of fire-resistant and/or heat-resistant fabric 524 to form a seal to prevent, or at least hinder, the passage of smoke there-through.

As discussed above, for laterally-sliding roller shutters, there is usually a 15 mm gap 528 between the lower end of the roller curtain 502 and the floor level, to allow smooth movement of the roller curtain 502 amongst the various configurations. As hot air in the fire side rises, there is a volume within the fire side from the floor level to about 500 mm above the floor level at an air pressure which is negative relative to the atmospheric pressure. Thus, cooler air from the non-fire side of the roller curtain 502 will pass through the gap 528 between the lower end of the roller curtain 502 and the floor level to the fire side. This will inhibit the spread of smoke from the fire side to the non-fire side through the gap 528 between the lower end of the roller curtain 502 and the floor level.

Figure 36:
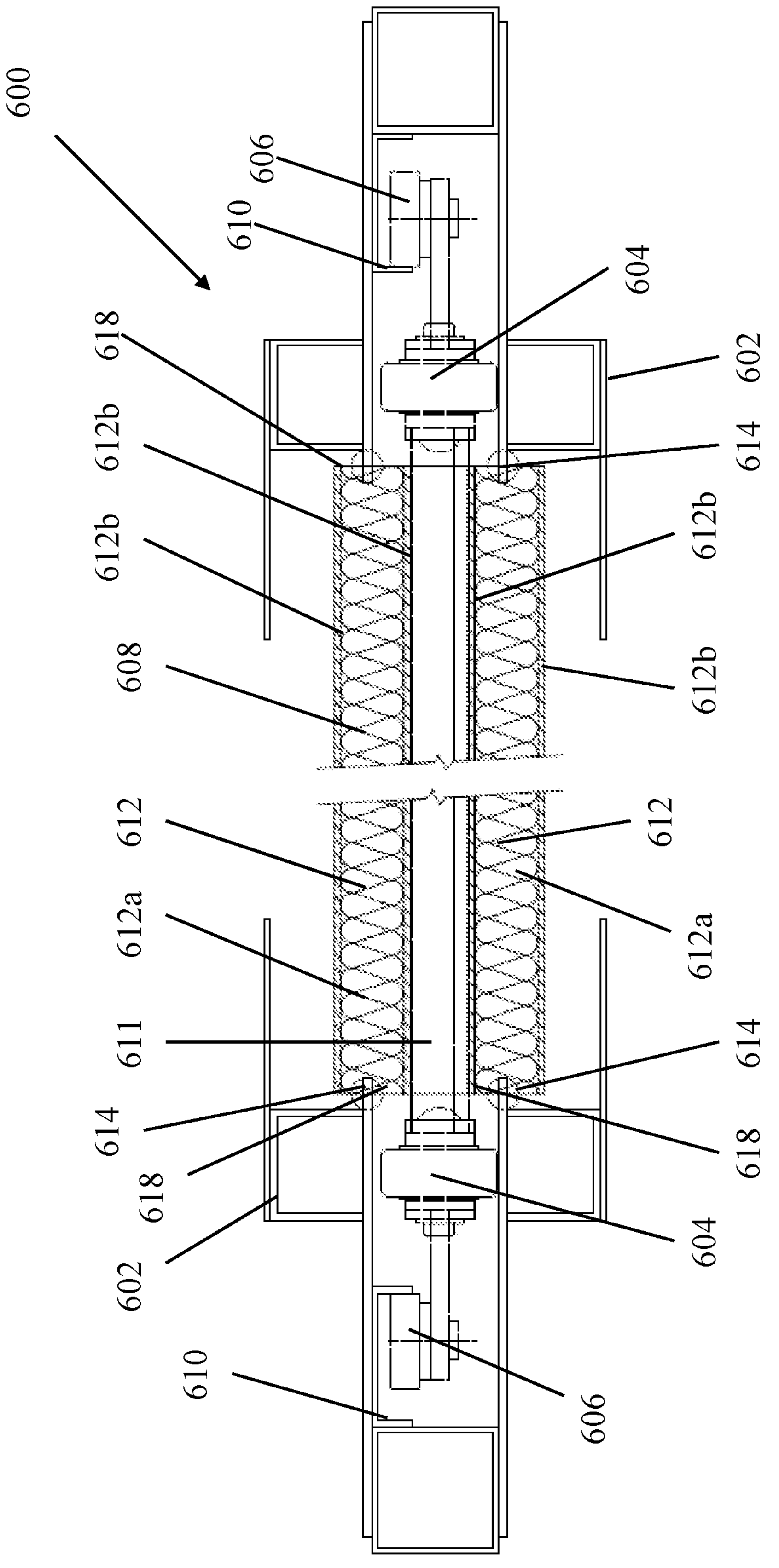
FIG. 36 is a vertical sectional view of a horizontally-sliding roller shutter according to a sixth embodiment of the present invention.

FIG. 36 is a vertical sectional view of a horizontally-sliding roller shutter according to a sixth embodiment of the present invention, generally designated as 600. The roller shutter 600 includes a pair of parallel guide rails 602 along and relative to which bearings 604, 606 are rotatable to move a roller curtain 608 (to which the bearings 604, 606 are rotatably engaged) relative to the guide rails 602 amongst its retracted configuration, extended configuration and fully-extended configuration. When in the fully-extended configuration, a free end of the roller curtain 608 is received within an end trough of the roller shutter 600 (to be discussed below). Each of the bearings 604 is rotatable about a horizontal axis of rotation and each of the bearings 606 is rotatable about a vertical axis of rotation. Each of the guide rails 602 is fixedly engaged with a generally reversed U-shaped trough 610 along and relative to an inner surface of which the bearings 606 rotate. This arrangement assists in keeping the roller curtain 608 flat and straight.

The roller curtain 608 is formed of a number of interlocking elongate stainless steel slat members 611, which slat members 611 collectively forming two opposite major surfaces. On each major surface of the interlocking slat members 611 is fixedly mounted a layer of fire-resistant and/or heat-resistant fabric 612. The layer of fire-resistant and/or heat-resistant fabric 612 includes a layer of fire-resistant and/or heat-resistant padding 612*a* sandwiched between two layers of fire-resistant and/or heat-resistant cloth 612*b*.

Along each of the guide rails 602 run two elongate cylindrical stainless steel members 614, each of which contacting or pressing into the layer of fire-resistant and/or heat-resistant padding 612*a* of the layer of fire-resistant and/or heat-resistant fabric 612 so as to form an elongate seal which prevents, or at least hinders, the passage of smoke there-through. The elongate members 614 may be of a diameter of around 10 mm. FIG. 36 shows four such elongate seals in the roller shutter 600. It can be seen that the elongate members 614 contact or press into the layers of fire-resistant and/or heat-resistant fabric 612 at locations other than a major surface of the layers of fire-resistant and/or heat-resistant fabric 612 to form the seals. In particular, as shown in FIG. 36, the elongate members 614 contact or press into side edges 618 of the layers of fire-resistant and/or heat-resistant fabric 612 (more particularly side edges of the layers of fire-resistant and/or heat-resistant padding 612*a*) to form the elongate seals.

Figure 37:
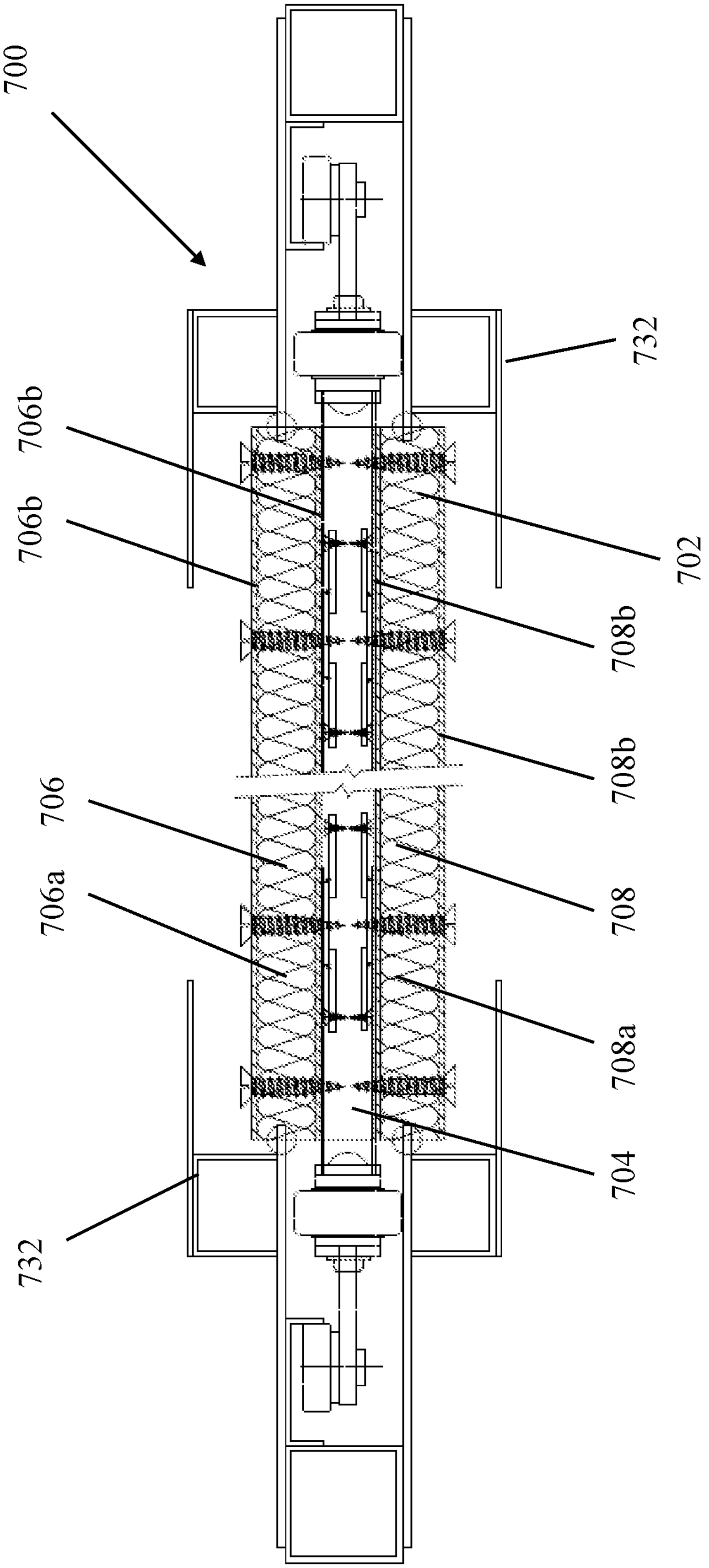
FIG. 37 is a vertical sectional view of a horizontally-sliding roller shutter according to a seventh embodiment of the present invention.

FIG. 37 shows a vertical sectional view of a roller curtain of a horizontally-sliding roller shutter, according to a seventh embodiment of the present invention, generally designated as 700. The main differences between the roller shutter 700 and the roller shutter 600 are in the construction of a roller curtain 702 of the roller curtain 700.

Generally stated, the roller curtain 702 is formed of a number of interlocking elongate stainless steel slat members 704 which collectively form two opposite major surfaces. On each major surface of the interlocking slat members 704 is respectively fixedly mounted a respective layer of fire-resistant and/or heat-resistant fabric 706, 708. The layer of fire-resistant and/or heat-resistant fabric 706 includes a layer of fire-resistant and/or heat-resistant padding 706*a* sandwiched between two outer layers of fire-resistant cloth 706*b*, and the layer of fire-resistant fabric 708 includes a layer of fire-resistant and/or heat-resistant padding 708*a* sandwiched between two layers of fire-resistant and/or heat-resistant cloth 708*b*.

Figure 38:
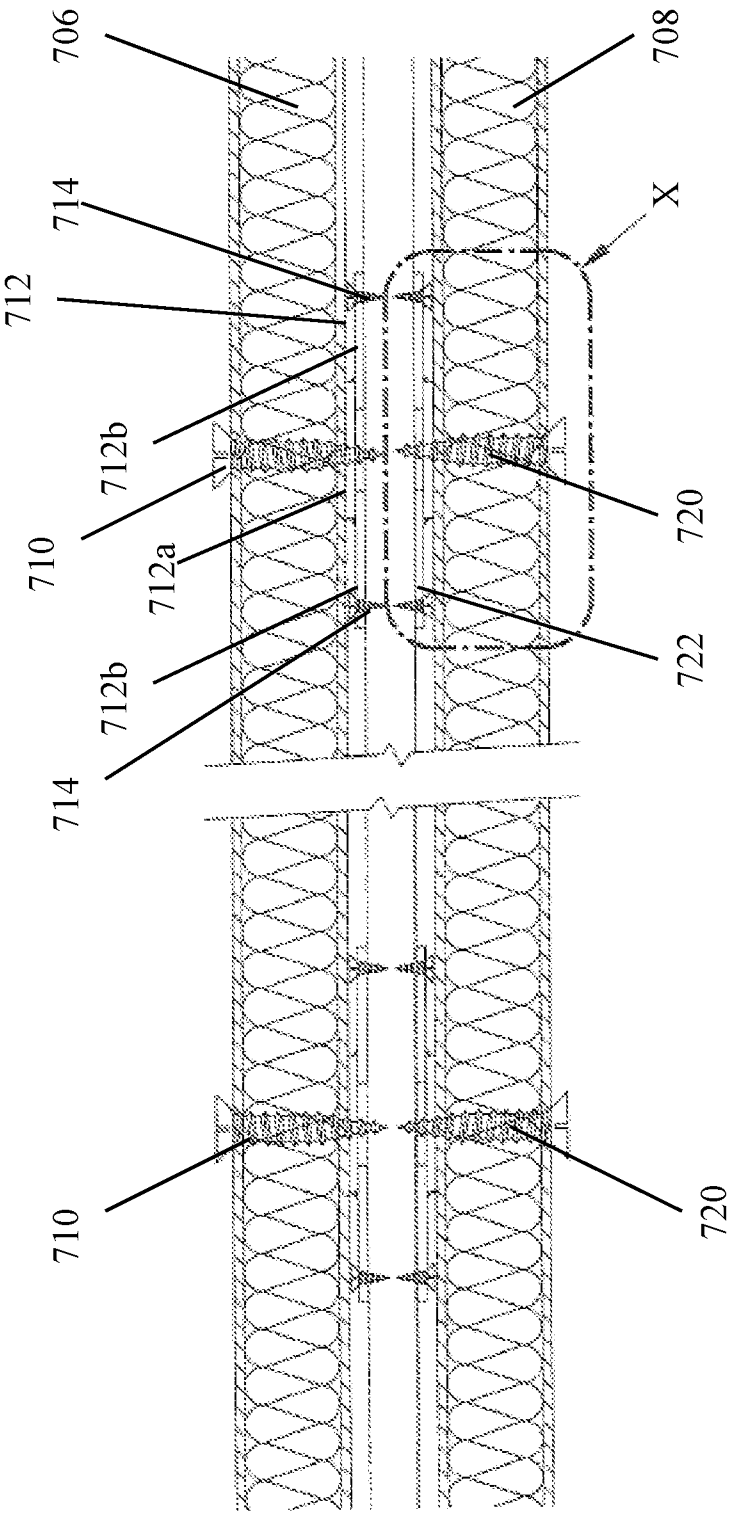
FIG. 38 is a partial enlarged view of the vertical sectional view of FIG. 37.
Figure 39:
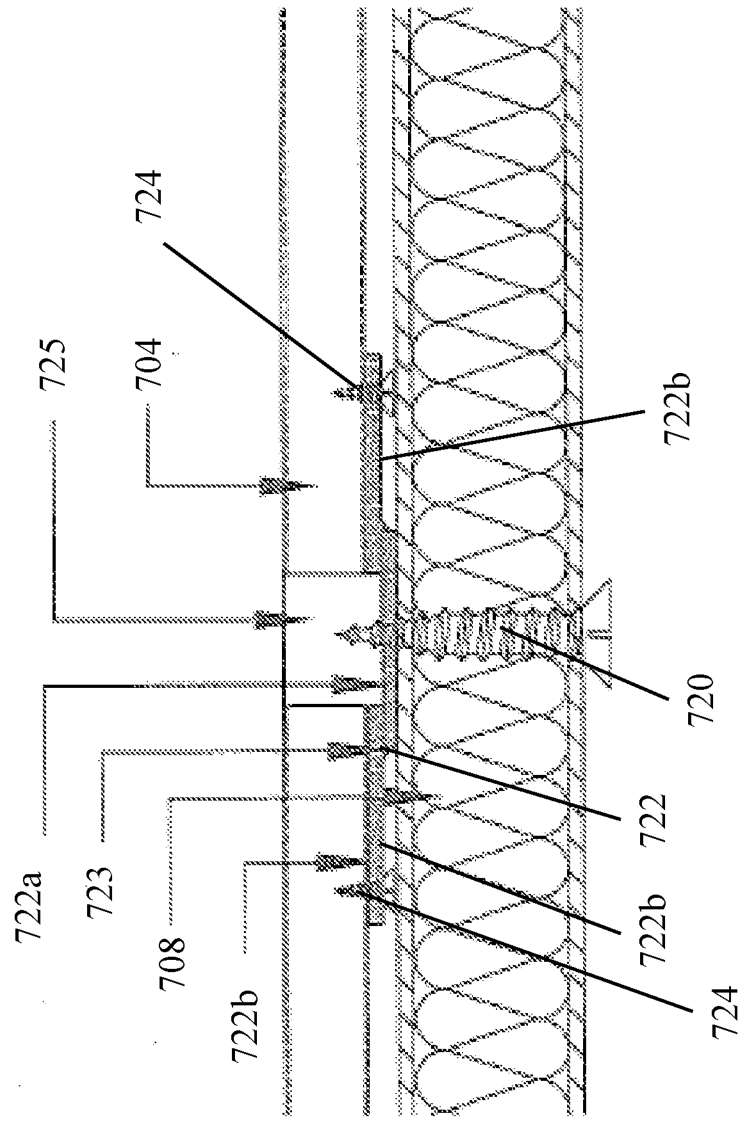
FIG. 39 is a still further enlarged view of the part marked X of the roller shutter of FIG. 38.

As shown more clearly in FIGS. 38 and 39, the layer of fire-resistant and/or heat-resistant fabric 706 is fixedly mounted to a major surface of the interlocking slat members 704 by a number of screws 710 (although it should be understood that other fastening means (e.g. nails or rivets) may be used) and a number of linkage members 712. Each linkage member 712 includes a copper middle part 712*a* and two copper side parts 712*b* on either side of the middle part 712*a*, although the middle part 712*a* and side parts 712*b* may be made of other suitable materials. The middle part 712*a* is fixedly joined with the two side parts 712*b* by a material of a melting temperature between 50° C. and 100° C., preferably of or below 70° C. In the present embodiment, the material may be a solder of a melting temperature of around 68° C., which is applied to form the linkage member 712 by soldering.

Each of the screws 710 extends through the thickness of the layer of fire-resistant and/or heat-resistant fabric 706 and is also received at least partly through the middle part 712*a* of the linkage member 712, so as to fixedly engage the layer of fire-resistant and/or heat-resistant fabric 706 with the middle part 712*a* of the linkage member 712. The screws 710 are not fixedly engaged (e.g. not in contact) with the interlocking slat members 704.

A screw 714 of a size smaller than that of the screw 710 is received through each of the side parts 712*b* of the linkage member 712 and partly into the interlocking slat members 704, so as to fixedly engage the side parts 712*b* of the linkage member 712 with the interlocking slat members 704. The layer of fire-resistant and/or heat-resistant fabric 706 is thus fixedly mounted to the interlocking slat members 704 via the screws 710, 714 and the linkage members 712.

The layer of fire-resistant and/or heat-resistant fabric 708 is fixedly mounted to a major surface of the interlocking slat members 704 by a number of screws 720 (although it should also be understood that other fastening means (e.g. nail or rivets) may be used) and a number of linkage members 722. Each linkage member 722 includes a middle part 722*a* and two side parts 722*b* on either side of the middle part 722*a*. The middle part 722*a* is fixedly joined with the two side parts 722*b* by a material of a melting temperature between 50° C. and 100° C., preferably of or below 70° C. In the present embodiment, the material may be a solder 723 of a melting temperature of around 68° C., which is applied to form the linkage member 722 by soldering.

Each of the screws 720 extends through the thickness of the layer of fire-resistant and/or heat-resistant fabric 708 and is also received at least partly through the middle part 722*a* of the linkage member 722, so as to fixedly engage the layer of fire-resistant and/or heat-resistant fabric 708 with the middle part 722*a* of the linkage member 722. The screws 720 are not fixedly engaged (e.g. not in contact) with the interlocking slat members 704. In particular, holes 725 are formed through the slat members 704 to allow ends of the screws 720 to extend therein.

A screw 724 of a size smaller than that of the screw 720 is received through each of the side parts 722*b* of the linkage member 722 and partly into the interlocking slat members 704, so as to fixedly engage the side parts 722*b* of the linkage member 722 with the interlocking slat members 704. The layer of fire-resistant and/or heat-resistant fabric 708 is thus fixedly mounted to the interlocking slat members 704 via the screws 720, 724 and the linkage members 722.

Figure 40:
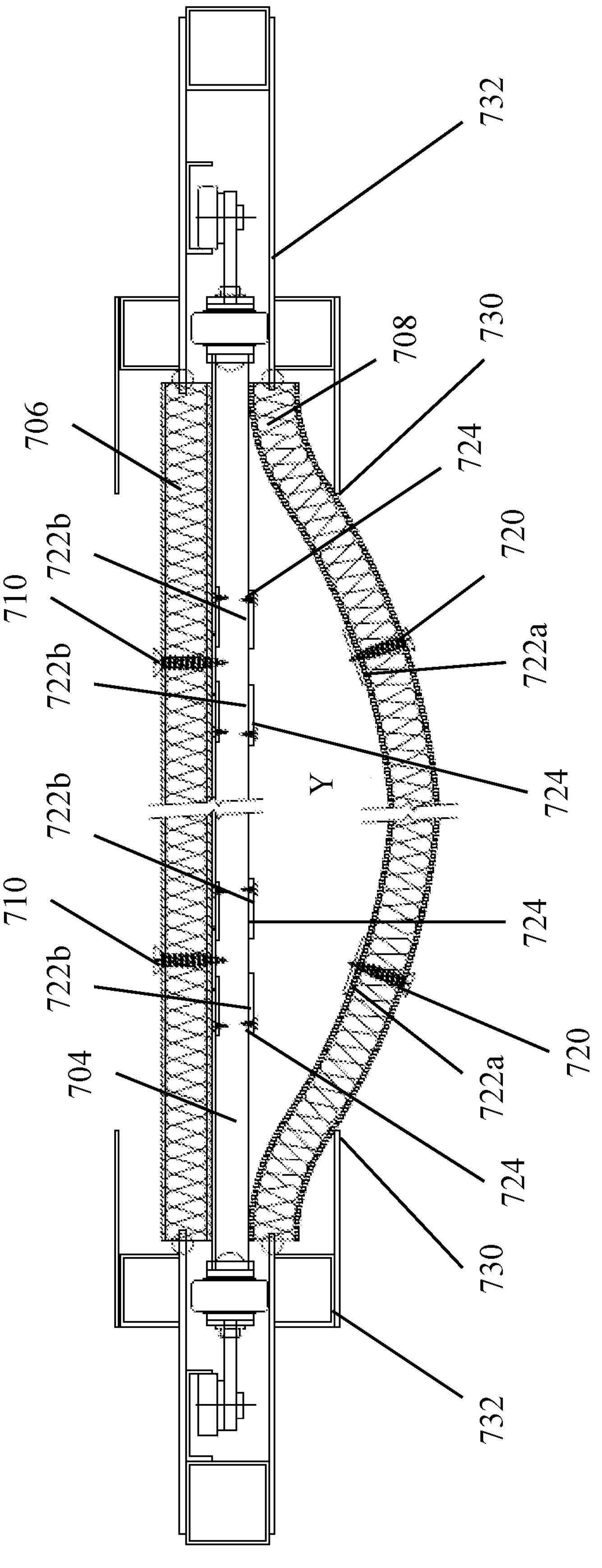
FIG. 40 is a vertical sectional view of the roller curtain of the roller shutter of FIG. 37 when subjected to high temperature.

Referring to FIG. 40, and assuming that the layer of fire-resistant and/or heat-resistant fabric 708 of the roller curtain 702 faces the fire side. Because of the rise in temperature, e.g. up to or above 68° C., the solder 723 between the middle part 722*a* and the side parts 722*b* of each of the linkage members 722 melts so that the middle part 722*a* is detached from the side parts 722*b* of the respective linkage members 722. The layer of fire-resistant and/or heat-resistant fabric 708 will then deform and fall on its own weight such that the outer surface of the layer of fire-resistant and/or heat-resistant fabric 708 comes into contact with two opposite inner edges 730 of two parallel guide rails 732 of the roller shutter 700 to form two elongate seals to prevent, or at least hinder, the passage of smoke there-through. In addition, with the deformation of the layer of fire-resistant and/or heat-resistant fabric 708 and its movement away from the interlocking slat members 704, an air gap Y exists between the layer of fire-resistant and/or heat-resistant fabric 708 and the interlocking slat members 704, thus forming an insulation air layer which assists in hindering the spread of heat across the roller shutter 700.

Figure 41B:
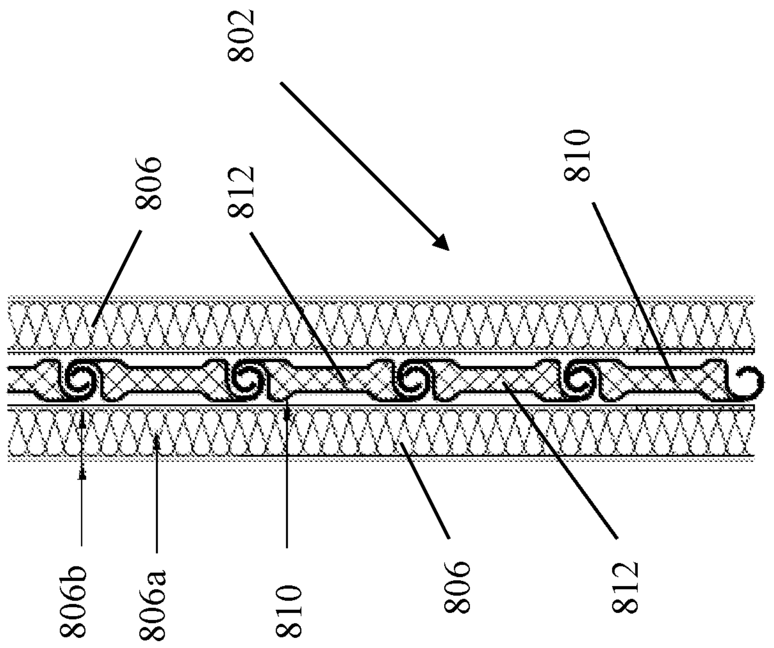
FIGS. 41A and 41B show sectional views of two roller curtains which may be used in the roller shutters of FIGS. 28, 31, 36 and 37.
Figure 41A:
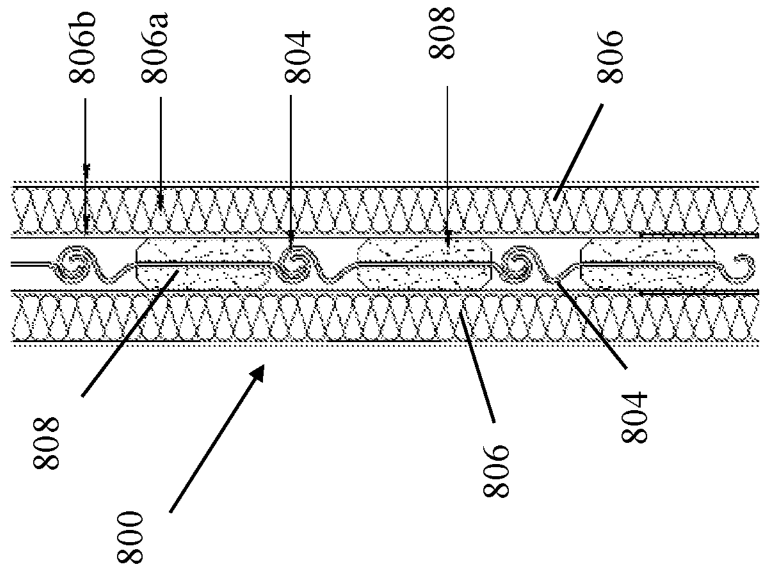

FIGS. 41A and 41B show sectional views of two roller curtains 800, 802 which may be used in the above roller shutters 400, 500, 600, 700. In the roller curtain 800, a number of stainless steel slat members 804 are interlocked with each other for relative pivotal movement. On each major surface of the interlocking slat members 804 is fixedly mounted a layer of fire-resistant and/or heat-resistant fabric 806 with a layer of fire-resistant and heat-resistant cotton 806*a* sandwiched between two layers of fire-resistant and heat-resistant cloth 806*b*. On each major surface of each slat member 804 is mounted a magnesium oxide fireproof board 808, which enhances the heat-resistance and fire-resistance of the roller curtain 800.

In the roller curtain 802, a number of stainless steel slat members 810 are interlocked with each other for relative pivotal movement. On each major surface of the interlocking slat members 810 is fixedly mounted a layer of fire-resistant and/or heat-resistant fabric 806 with a layer of fire-resistant and heat-resistant cotton 806*a* sandwiched between two layers of fire-resistant and heat-resistant cloth 806*b*. Each slat member 810 is formed with an internal cavity containing fire-resistant and heat-resistant cotton 812 for enhancing the heat-resistance and fire-resistance of the roller curtain 802.

Figure 42C:
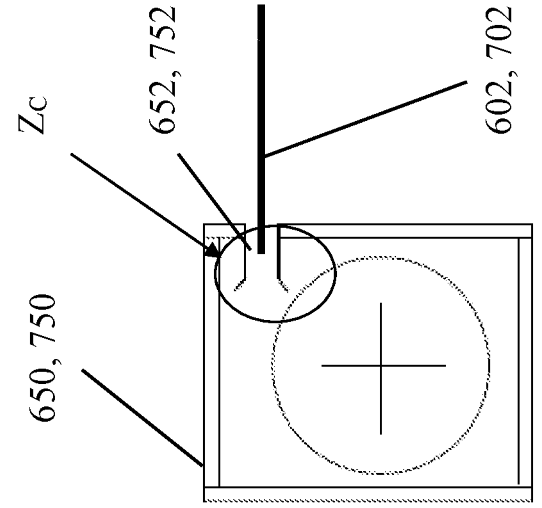
FIG. 42C shows a schematic side view of the chamber and the roller curtain of the roller shutters of FIGS. 36 and 37.
Figure 42B:
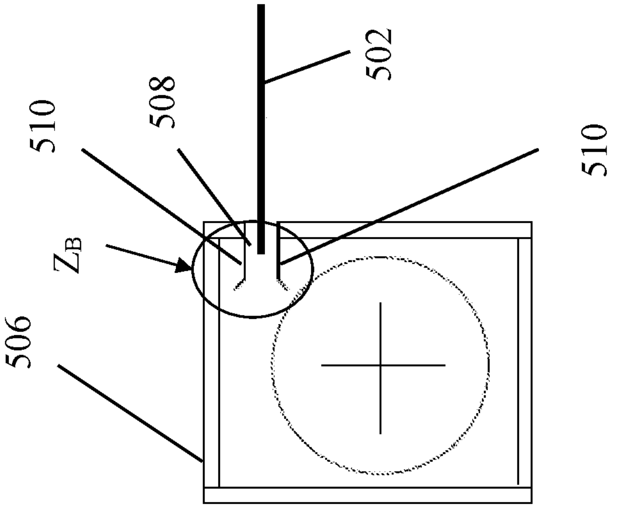
FIG. 42B shows a schematic top view of the chamber and the roller curtain of the roller shutter of FIG. 31.
Figure 42A:
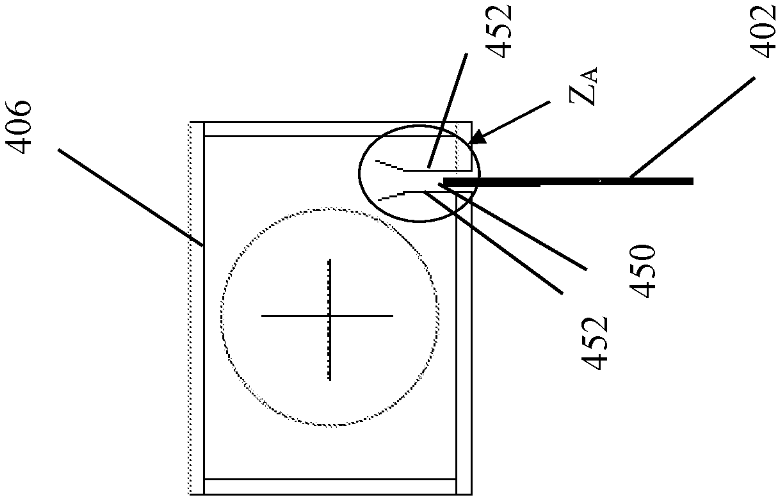
FIG. 42A shows a schematic side view of the chamber and the roller curtain of the roller shutter of FIG. 28.
Figure 43B:
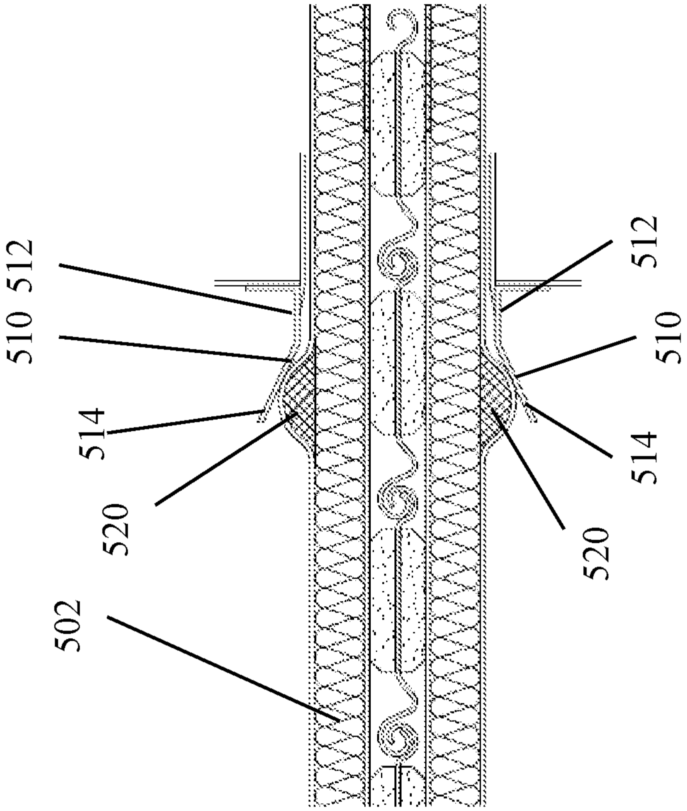
FIG. 43B is an enlarged view of the part marked $Z_B$ in FIG. 42B.
Figure 43A:
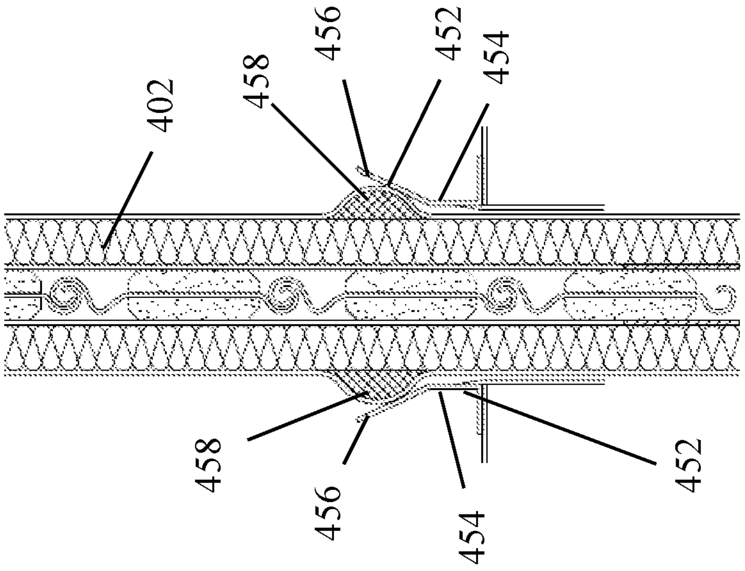
FIG. 43A is an enlarged view of the part marked $Z_A$ in FIG. 42A.

FIG. 42A shows a schematic side view of the chamber 406 and the roller curtain 402 of the roller shutter 400, in which the roller curtain 402 extends at least partly outward through an opening 450 of the chamber 406, and FIG. 43A is an enlarged view of the part marked $Z_A$ in FIG. 42A. The chamber 406 is formed of stainless steel, covered by heat-resistant and/or fire-resistant cloth and cotton, and is well-sealed up for preventing leaking of gas. Slightly inward of the opening 450 of the chamber 406 are two elongate fire barrier sheets 452. The two fire barrier sheets 452 have two generally parallel edges 454 and two inclined edges 456 which lead into the cavity of the chamber 406. The two inclined edges 456 diverge from the two edges 454. As shown in FIG. 43A, when the roller curtain 402 is in the fully-extended configuration, a piece of elongate ceramic fabric cloth 458 carried by (and is thus movable simultaneously with and by) the roller curtain 402 is jammed between the space between one of the inclined edges 456 and the roller curtain 402, and another piece of elongate ceramic fabric cloth 460 carried by the roller curtain 402 is jammed between the space between another of the inclined edges 456 and the roller curtain 402, to prevent further outward movement of the roller curtain 402 from the chamber 406 and to form two elongate seals which prevent, or at least hinder, the passage of smoke there-through, and thus through the chamber 406.

FIG. 42B shows a schematic top view of the chamber 506 and the roller curtain 502 of the roller shutter 500, in which the roller curtain 502 extends at least partly outward through the opening 508 of the chamber 506, and FIG. 43B is an enlarged view of the part marked $Z_B$ in FIG. 42B. The chamber 506 is formed of stainless steel, covered by heat-resistant and/or fire-resistant cloth and cotton, and is well-sealed up for preventing leaking of gas. Slightly inward of the opening 508 of the chamber 506 are two elongate fire barrier sheets 510. When viewed from above, the two fire barrier sheets 510 have two generally parallel edges 512 and two inclined edges 514 which lead into the cavity of the chamber 506. The two inclined edges 514 diverge from the two edges 512. As shown in FIG. 43B, when the roller curtain 502 is in the fully-extended configuration, the piece of elongate ceramic fabric cloth 520 carried by (and is thus movable simultaneously with and by) the roller curtain 502 is jammed between the space between one of the inclined edges 514 and the roller curtain 502, and the other piece of elongate ceramic fabric cloth 520 carried by the roller curtain 502 is jammed between the space between the other of the inclined edges 514 and the roller curtain 502, to prevent further outward movement of the roller curtain 502 from the chamber 506 and to form two elongate seals which prevent, or at least hinder, the passage of smoke there-through, and thus through the chamber 506.

Figure 43C:
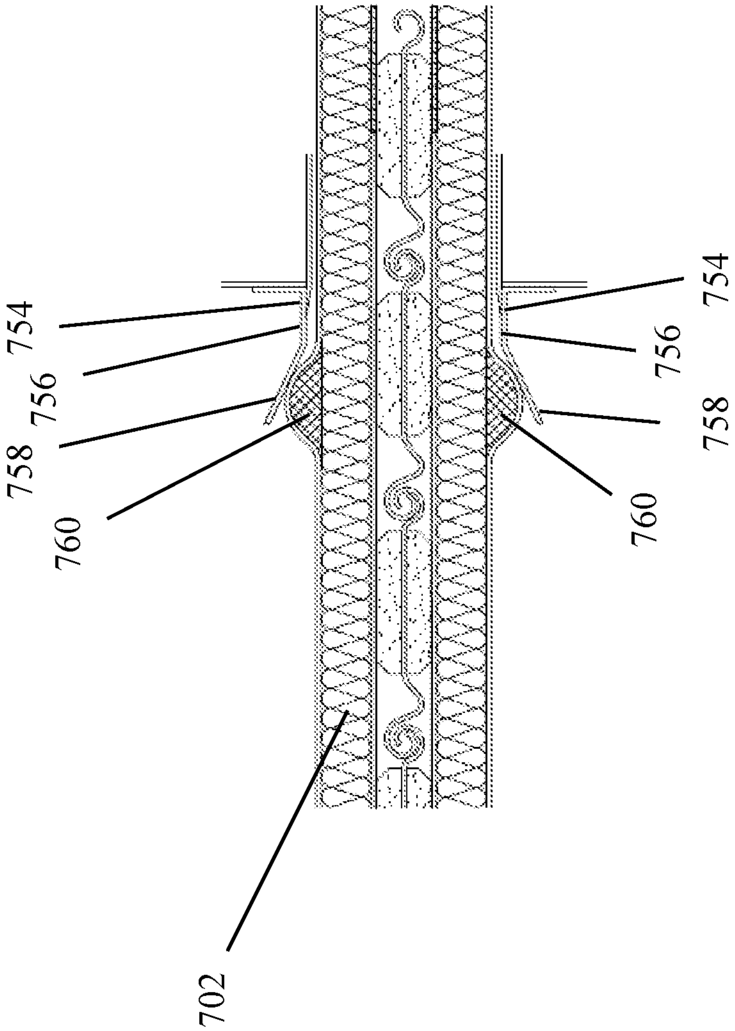
FIG. 43C is an enlarged view of the part marked $Z_C$ in FIG. 42C.

FIG. 42C shows, in one figure, a schematic side view of a chamber 650 and the roller curtain 602 of the roller shutter 600 and a chamber 750 and the roller curtain 702 of the roller shutter 700, in which the roller curtain 602, 702 extends through an opening 652, 752 of the chamber 650, 750, and FIG. 43C is an enlarged view of the part marked $Z_C$ in FIG. 42C. Using the roller shutter 700 as an example, the chamber 750 is formed of stainless steel, covered by heat-resistant and/or fire-resistant cloth and cotton, and is well-sealed up for preventing leaking of gas. Slightly inward of the opening 752 of the chamber 750 are two elongate fire barrier sheets 754. The two fire barrier sheets 754 have two generally parallel edges 756 and two inclined edges 758 which lead into the cavity of the chamber 750. The two inclined edges 758 diverge from the two edges 756. As shown in FIG. 43C, when the roller curtain 702 is in the fully-extended configuration, a piece of elongate ceramic fabric cloth 760 carried by (and is thus movable simultaneously with and by) the roller curtain 702 is jammed between the space between one of the inclined edges 758 and the roller curtain 702, and another piece of elongate ceramic fabric cloth 762 carried by the roller curtain 702 is jammed between the space between another of the inclined edges 758 and the roller curtain 702, to prevent further outward movement of the roller curtain 702 from the chamber 750 and to form two elongate seals which prevent, or at least hinder, the passage of smoke there-through, and thus through the chamber 750.

Figure 44:
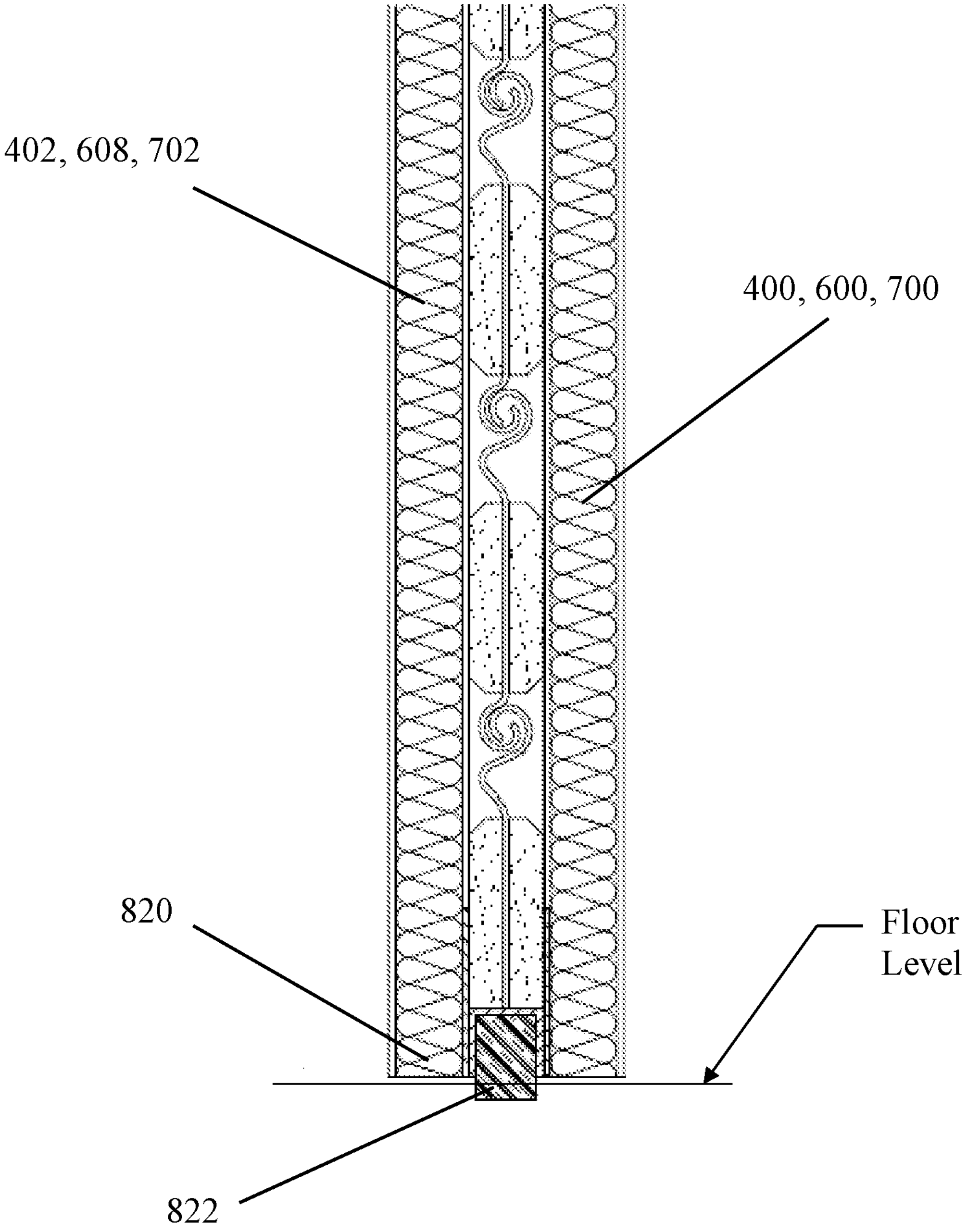
FIG. 44 is a vertical sectional view of a free end of a roller curtain of the roller shutters of FIGS. 28, 36 and 37 as received below the floor level.

FIG. 44 is a vertical sectional view of a free end 820 of the roller curtain 402, 608, 702 of the respective roller shutters 400, 600, 700, which shows that when the respective roller curtain 402, 608, 702 is in the fully-extended configuration, the free end 820 extends into a cavity below the floor level to form an elongate seal 822 which prevents, or at least hinders, the passage of smoke there-through.

Figure 45:
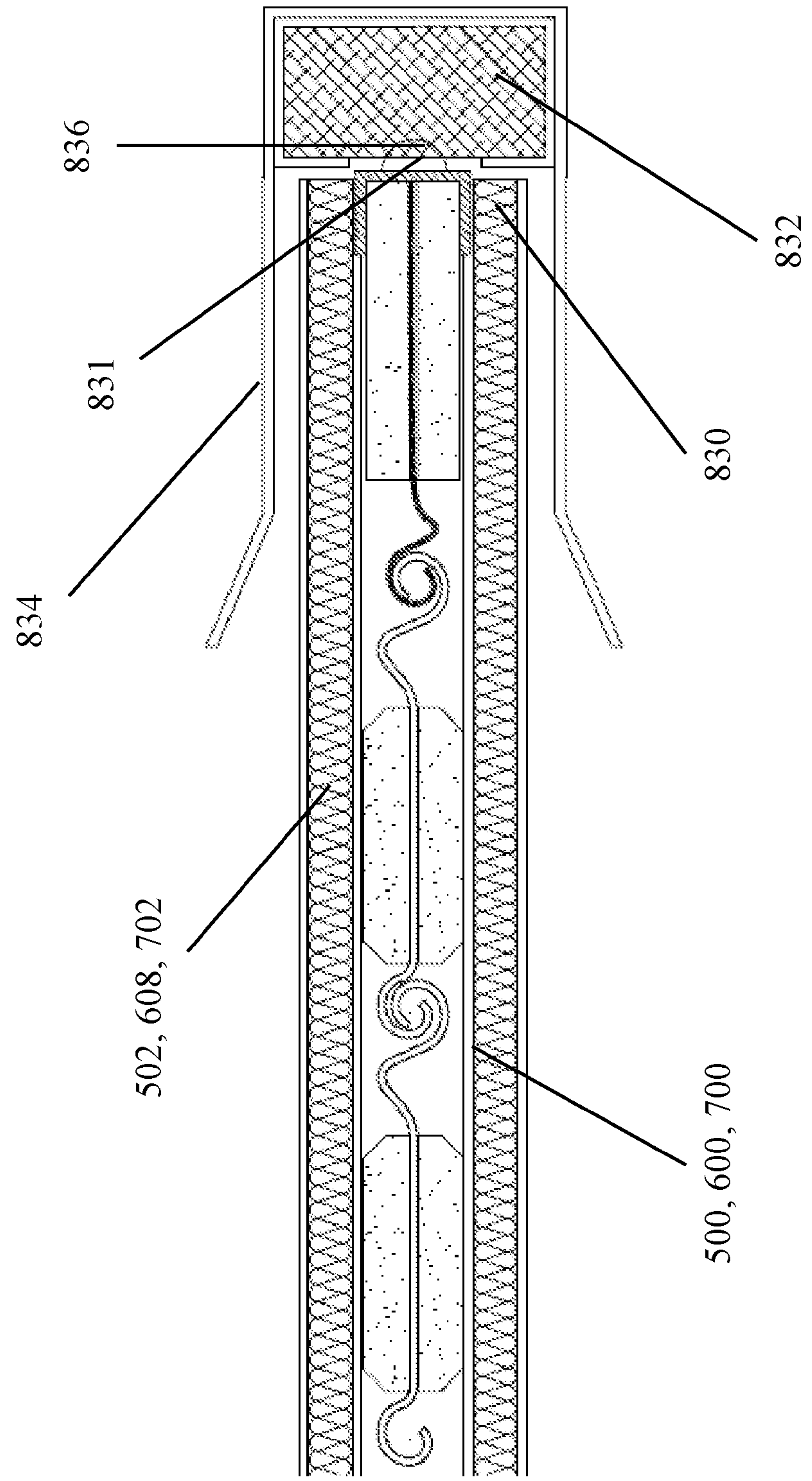
FIG. 45 is a sectional view of a free end of a roller curtain of the roller shutters of FIGS. 31, 36 and 37 as received within an end trough.

FIG. 45 is a sectional view of a free end 830 of a roller curtain 502, 608, 702 of the respective roller shutters 500, 600, 700, which shows that, when the respective roller curtain 502, 608, 702 is in the fully-extended configuration, the free end 830 is received within an end trough 834, and an elongate semi-cylindrical stainless steel member 831 of the free end 830 of the respective roller curtain 502, 608, 702 contacts or presses into a fire-resistant and/or heat-resistant material 832 in the end trough 834 to form an elongate seal 836 which prevents, or at least hinders, the passage of smoke there-through. It should be understood that FIG. 45 shows an alternative arrangement (as distinct from that shown in FIG. 44) in that the end trough 834 within which the free end 830 of the roller curtain 608, 702 is receivable is not below the floor level.

As shown, a roller shutter (400, 500, 600, 700) is disclosed as including a chamber (406, 506, 650, 750) with an opening (450, 508, 652, 752), a roller curtain (402, 502, 608, 702, 800, 802) movable between a retracted configuration in which the roller curtain is substantially fully contained within the chamber and an extended configuration in which at least part of the roller curtain extends beyond the chamber through the opening, and at least one guide rail (408, 522, 602, 732) along and relative to which the roller curtain is movable between the retracted configuration and the extended configuration, the roller curtain including a plurality of slat members (404, 504, 611, 704, 804, 810) interlocked with each other for relative pivotal movement, the plurality of slat members collectively forming a first major surface and an opposite second major surface, and a first layer of fire-resistant and/or heat-resistant fabric (410, 524, 612, 706, 806) fixedly mounted to the first major surface of the plurality of slat members and a second layer of fire-resistant and/or heat-resistant fabric (410, 524, 612, 708, 806) fixedly mounted to the second major surface of the plurality of slat members, and the guide rail including at least a sealing member (412, 526, 614) which, when the roller curtain is in the extended configuration, contacts or presses into the first layer of fire-resistant and/or heat-resistant fabric to form a seal which prevents or at least hinders the passage of smoke there-through.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A roller shutter including:

a chamber with an opening, a roller curtain movable between a retracted configuration in which said roller curtain is substantially fully contained within said chamber and an extended configuration in which at least part of said roller curtain extends beyond said chamber through said opening, and at least one guide rail along and relative to which said roller curtain is movable between said retracted configuration and said extended configuration, wherein said roller curtain includes a plurality of slat members interlocked with each other for relative pivotal movement, said plurality of slat members collectively forming a first major surface and a second major surface, and a first layer of fire-resistant and/or heat-resistant fabric fixedly mounted to said first major surface of said plurality of slat members and a second layer of fire-resistant and/or heat-resistant fabric fixedly mounted to said second major surface of said plurality of slat members, and wherein said guide rail includes at least a first sealing member which, when said roller curtain is in said extended configuration, contacts or presses into said first layer of fire-resistant and/or heat-resistant fabric to form a first seal which at least hinders the passage of smoke there-through, wherein said roller curtain includes an elongate member, wherein said guide rail includes a trough, wherein said elongate member moves along and relative to said trough when said roller curtain moves between said retracted configuration and said extended configuration, wherein said trough has an opening adapted to prevent detachment of said elongate member from said trough in a direction substantially perpendicular to a length of said elongate member and substantially perpendicular to a normal to said first major surface, and wherein, upon bending of said roller curtain, said elongate member is adapted to contact at least two wall surfaces of said trough to form at least two second seals which at least hinder the passage of smoke there-through.

2. The roller shutter according to claim 1, wherein said elongate member includes a cylinder of ceramic fiber wrapped around by at least a piece of ceramic fiber cloth.

3. A roller shutter including:

a chamber with an opening, a roller curtain movable between a retracted configuration in which said roller curtain is substantially fully contained within said chamber and an extended configuration in which at least part of said roller curtain extends beyond said chamber through said opening, and at least one guide rail along and relative to which said roller curtain is movable between said retracted configuration and said extended configuration, wherein said roller curtain includes a plurality of slat members interlocked with each other for relative pivotal movement, said plurality of slat members collectively forming a first major surface and a second major surface, and a first layer of fire-resistant and/or heat-resistant fabric fixedly mounted to said first major surface of said plurality of slat members and a second layer of fire-resistant and/or heat-resistant fabric fixedly mounted to said second major surface of said plurality of slat members, and wherein said guide rail includes at least a first sealing member which, when said roller curtain is in said extended configuration, contacts or presses into said first layer of fire-resistant and/or heat-resistant fabric to form a first seal which at least hinders the passage of smoke there-through, wherein said first layer of fire-resistant and/or heat-resistant fabric is fixedly mounted to said first major surface of said plurality of slat members via at least one linkage member, wherein said linkage member includes at least a first link element and a second link element fixedly joined with each other by a material of a melting temperature of or below 100° C., wherein said roller shutter comprises a horizontally-sliding roller shutter, and wherein, when surrounding temperature rises to at least said melting temperature of said material, said first link element and second link element are detachable from each other, and said first layer of fire-resistant and/or heat-resistant fabric is adapted to be at least partly detached from said plurality of slat members and deforms on its own weight to contact at least two wall surfaces of said guide rail to form at least two third seals which at least hinder the passage of smoke there-through.

4. The roller shutter according to claim 3, wherein, upon detachment of said first layer of fire-resistant and/or heat-resistant fabric from said plurality of slat members, an air gap exists between said first layer of fire-resistant and/or heat-resistant fabric and said plurality of slat members.

5. The roller shutter according to claim 3, wherein said material is a solder.

* * * * *